(12) United States Patent
Fei et al.

(10) Patent No.: US 11,115,140 B2
(45) Date of Patent: Sep. 7, 2021

(54) SIGNAL STRENGTH MEASUREMENT METHOD, AND RELATED APPARATUS AND SYSTEM

(71) Applicant: HUAWEI TECHNOLOGIES CO., LTD., Guangdong (CN)

(72) Inventors: Yongqiang Fei, Beijing (CN); Zhiheng Guo, Beijing (CN); Xinqian Xie, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 18 days.

(21) Appl. No.: 16/786,696

(22) Filed: Feb. 10, 2020

(65) Prior Publication Data
US 2020/0177291 A1 Jun. 4, 2020

Related U.S. Application Data

(63) Continuation of application No. PCT/CN2018/096766, filed on Jul. 24, 2018.

(30) Foreign Application Priority Data

Aug. 11, 2017 (CN) .......................... 201710687953.3

(51) Int. Cl.
*H04B 17/318* (2015.01)
*H04W 24/10* (2009.01)
*H04W 72/04* (2009.01)

(52) U.S. Cl.
CPC .......... *H04B 17/318* (2015.01); *H04W 24/10* (2013.01); *H04W 72/0453* (2013.01)

(58) Field of Classification Search
CPC ................. H04B 17/318; H04W 24/10; H04W 72/0453; H04W 24/02; H04W 72/04
See application file for complete search history.

(56) References Cited

U.S. PATENT DOCUMENTS 10,644,845 B2* 5/2020 Yang ..................... H04L 1/0026
10,727,995 B2* 7/2020 Nam ........................ H04L 5/14
(Continued)

FOREIGN PATENT DOCUMENTS

| CN | 103428749 A | 12/2013 |
| CN | 104081810 A | 10/2014 |

(Continued)

OTHER PUBLICATIONS

Huawei et al: "UE-to-UE measurement for cross-link interference mitigation",3GPP Draft; R1-1709982, Jun. 26, 2017 (Jun. 26, 2017), XP051299207,,total 9 pages.
(Continued)

*Primary Examiner* — Brian T O Connor
(74) *Attorney, Agent, or Firm* — Womble Bond Dickinson (US) LLP

(57) ABSTRACT

A signal strength measurement method is disclosed, the method including: receiving first indication information, where the first indication information includes first sub-information, second sub-information, and third sub-information, the first sub-information indicates a measurement period for measurement, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; determining a measurement resource based on the first indication information; performing signal strength measurement on a signal on the measurement resource; and sending a measurement result.

17 Claims, 18 Drawing Sheets

(56) References Cited

U.S. PATENT DOCUMENTS

| | | | |
|---|---|---|---|
| 10,873,869 B2* | 12/2020 | Sundararajan | H04W 72/12 |
| 2019/0007147 A1 | 1/2019 | Li et al. | |
| 2019/0273600 A1* | 9/2019 | Wang | H04B 17/345 |
| 2020/0389805 A1* | 12/2020 | Kim | H04L 1/0027 |

FOREIGN PATENT DOCUMENTS

| | | | |
|---|---|---|---|
| CN | 105307190 A | 2/2016 | |
| CN | 106454928 A | 2/2017 | |
| EP | 3300414 A1 | 3/2018 | |
| WO | 2017014229 A1 | 1/2017 | |
| WO | 2017075795 A1 | 5/2017 | |

OTHER PUBLICATIONS

Huawei et al Overview on cross-link interference mitigation 3GPP TSG RAN WG1 Meeting #88bis R1-1704245 Spokane, USA, Apr. 3-7, 2017, total 3 pages.

ZTE: "UE-to-UE measurement as an enabler for CLI mitigation schemes",3GPP Draft; R1-1710128 Jun. 26, 2017 (Jun. 26, 2017), XP051299352,total 9 pages.

3GPP TS 38331 V0.0.4 (Jun. 2017)3rd Generation Partnership Project;Technical Specification Group Radio Access Network;NR-;Radio Resource Control (RRC);Protocol specification(Release 15), total 22 pages.

Huawei et al: "On CLI measurement and power control for cross-link interference mitigation",3GPP Draft; R1-1704255, Apr. 2, 2017 (Apr. 2, 2017), XP051242407,total 7 pages.

3GPP TS 38.215 V0.0.0 (May 2017),3rd Generation Partnership Project;Technical Specification Group Radio Access Network;NR;Physical layer measurements(Release 15), total 6 pages.

Qualcomm Incorporated: "Dynamic TOD UE to UE measurement considerations",3GPP Draft; R1-1711225 Jun. 26, 2017 (Jun. 26, 2017), XP051300424,total 7 pages.

ZTE et al: "Discussion on Measurements and RS Design for CLI Mitigation",3GPP Draft; R1-1701615 Feb. 12, 2017 (Feb. 12, 2017),XP051208782,total 13 pages.

ZTE: "Discussion on Measurements and RS Design for CLI Mitigation",3GPP Draft; R1-1707204 May 14, 2017 (May 14, 2017), XP051272419,total 9 pages.

\* cited by examiner

SIGNAL STRENGTH MEASUREMENT METHOD, AND RELATED APPARATUS AND SYSTEM

CROSS-REFERENCE TO RELATED APPLICATIONS

This application is a continuation of International Application No. PCT/CN2018/096766, filed on Jul. 24, 2018, which claims priority to Chinese Patent Application No. 201710687953.3, filed on Aug. 11, 2017. The disclosures of the aforementioned applications are hereby incorporated by reference in their entireties.

TECHNICAL FIELD

The present disclosure relates to the field of wireless communications, and in particular, to a signal strength measurement method, and a related apparatus and system.

BACKGROUND

In a wireless communications system, in an indoor hotspot scenario or a scenario of dense coverage of small cells, distances between terminal devices within different cell coverage are relatively small. Consequently, cross-link interference severely affects downlink-signal receiving performance of terminal devices in neighboring cells. To enable coordinated scheduling between network devices, each network device needs to learn of in advance information about cross-link interference (CLI) that a terminal device served within coverage of the network device may suffer. Considering that the network device cannot directly obtain information about a link between terminal devices within different cell coverage, the terminal devices need to perform CLI measurement, and each terminal device obtains CLI information of the terminal device and reports a measurement result to the network device.

Currently, to enable the terminal devices to accurately obtain the CLI information, the network device may configure the terminal device to perform received signal strength indicator (RSSI) measurement. The RSSI measurement is power measurement. The network device configures a parameter of the RSSI measurement for the terminal device by using higher layer signaling, and the parameter may include a time-domain period, a time-domain measurement subframe offset, time-domain measurement duration, and a frequency-domain measurement bandwidth. With the configurations of the period and the measurement subframe offset, the terminal device can determine a specific subframe in which the RSSI measurement starts. In addition, with the configuration of the measurement duration, the terminal device can determine a symbol of a subframe in which the power measurement starts to perform the power measurement. From a perspective of frequency domain, the network device configures the bandwidth for the RSSI measurement for the terminal device, and the bandwidth is usually a downlink bandwidth or a maximum allowed bandwidth of the network device.

However, from a perspective of time domain, the RSSI measurement has only a subframe-level offset, and the measurement duration less than a length of one subframe also has only a configurable value of one symbol. Consequently, in a current measurement solution, signal powers in several symbols in a subframe cannot be precisely measured.

SUMMARY

Embodiments of the present disclosure provide a signal strength measurement method, and a related apparatus and system, to improve measurement precision of signal strength measurement during coordinated scheduling.

In view of this, a first aspect of the embodiments of the present disclosure provides a signal strength measurement method. The method may include the following operations:

First, a terminal device may receive first indication information sent by a network device, where the network device may be a 5G gNodeB, or may be another similar network device. The first indication information includes first sub-information, second sub-information, and third sub-information, the first sub-information is used to indicate a measurement period for measurement, the measurement period includes at least one second time unit, and the second time unit includes at least two first time units. The first time unit may be one sampling point, half a symbol, or one symbol, and the second time unit may be one slot, one mini-slot, or the like.

The second sub-information is used to indicate an offset of a start position of a first time unit for measurement in the measurement period relative to a start position of a second time unit for measurement. The third sub-information is used to indicate an offset of the start position of the second time unit for measurement relative to a start position of the measurement period. The second time unit usually belongs to a non-downlink time unit. The "non-downlink time unit" includes three types: an "uplink time unit", an "idle time unit", and an "uplink/downlink time unit". The "idle time unit" indicates a time unit in which neither uplink data nor downlink data is transmitted. The "uplink/downlink time unit" indicates some time units that are defined in NR and in which either uplink data or downlink data can be transmitted.

It may be understood that the second sub-information and the third sub-information may be two parameters (or two messages), or may be two fields of a same parameter (or a same message), or may be two pieces of information obtained after a same parameter (or a same message) is interpreted in a predefined manner.

Next, the terminal device may determine a measurement resource based on the first indication information, where the measurement resource is determined in the measurement period based on the start position of the first time unit and the start position of the second time unit. Then, the terminal device performs signal strength measurement, in other words, performs power measurement, on a signal on the measurement resource, and finally reports a measurement result to the network device. Until now, a procedure of signal strength measurement is completed.

In the embodiments of the present disclosure, the signal strength measurement method is provided. The method includes: First, the terminal device receives the first indication information sent by the network device, where the first indication information includes the first sub-information, the second sub-information, and the third sub-information, the first sub-information is used to indicate the measurement period for measurement, the measurement period includes at least one second time unit, the second time unit includes at least two first time units, the third sub-information is used to indicate the offset of the start position of the second time unit for measurement relative to the start position of the measurement period, the second sub-information is used to indicate the offset of the start position of the first time unit for measurement in the measurement period relative to the start position of the second time unit for measurement, and the second time unit belongs to a non-downlink time unit. Next, the terminal device determines the measurement resource based on the first indication information, where the measurement resource is determined in the measurement period based on the start position of the first time unit and the start position of the second time unit. Then, the terminal device performs signal strength measurement on the signal on the measurement resource, to obtain the measurement result. Finally, the terminal device sends the measurement result to the network device. In the foregoing manner, the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, in a first implementation of the first aspect of the embodiments of the present disclosure, the first indication information further includes measurement duration indication information, the measurement duration indication information indicates measurement duration, and a value of the measurement duration includes one first time unit, two first time units, four first time units, or six first time units. Therefore, the measurement resource is determined in the measurement period based on the start position of the first time unit, the start position of the second time unit, and the measurement duration.

It can be learned that in the embodiments of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, in a second implementation of the first aspect of the embodiments of the present disclosure, the terminal device may further receive measurement frequency band indication information sent by the network device, where the measurement frequency band indication information indicates the measurement frequency band indication information.

The measurement frequency band includes a bandwidth part for measurement, a measurement bandwidth, and a frequency domain position, or the measurement frequency band includes only a bandwidth part for measurement and a measurement bandwidth. The measurement bandwidth is less than or equal to a bandwidth of the bandwidth part. The bandwidth part includes a plurality of frequency domain units. Usually, frequency domain resource sizes of all the frequency domain units are the same. The frequency domain unit may be one subcarrier or several contiguous subcarriers. The frequency domain position may be determined in some manners, and the frequency domain position is used to indicate at least one target frequency domain unit used for measurement in the bandwidth part. The target frequency domain unit may be several contiguous frequency domain units, or may be several frequency domain units distributed in a comb shape.

In this way, the measurement resource is determined in the measurement period based on the start position of the first time unit, the start position of the second time unit, and the measurement frequency band.

Again, in the embodiments of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, in a third implementation of the first aspect of the embodiments of the present disclosure, alternatively, a plurality of sets of measurement parameters may be used to perform signal strength measurement in a same measurement frequency band. Specifically, the terminal device receives a plurality of pieces of first indication information sent by the network device, where each piece of first indication information corresponds to one set of measurement parameters. Then, the terminal device determines a plurality of measurement resources based on the plurality of pieces of first indication information, where each piece of first indication information corresponds to one measurement resource. Next, the terminal device performs signal strength measurement on a signal on each measurement resource, and obtains a measurement result. Certainly, each measurement result also corresponds to one measurement resource. Finally, the terminal device sends a plurality of measurement results to the network device.

In one embodiment, the terminal device may send some of the plurality of measurement results to the network device. Specifically, only when a measurement result meets a specific condition, for example, only when a measured signal strength exceeds a predefined threshold, the terminal device sends the measurement result to the network device.

It can be learned that in the embodiments of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, in a fourth implementation of the first aspect of the embodiments of the present disclosure, the network device may further send second indication information to the terminal device. In other words, the terminal device receives the second indication information sent by the network device. The second indication information is mainly used to indicate whether to perform measurement and/or reporting on the measurement resource.

Specifically, the second indication information may be indicated as "00", "01", "10", and "11", where "00" indicates that neither measurement nor reporting is performed on a measurement resource, "01" indicates that measurement instead of reporting is performed on a measurement resource, "10" indicates that reporting instead of measurement is performed on a measurement resource, and "11" indicates that both measurement and reporting are performed on the measurement resource.

Certainly, the foregoing second indication information and content indicated by the second indication information are each an example. In actual application, the second indication information and the indication content may alternatively be in another form. This is not limited herein.

It can be learned that in the embodiments of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

In one embodiment, in a fifth implementation of the first aspect of the embodiments of the present disclosure, that the terminal device sends at least one measurement result to the network device may include the following operations:

The terminal device receives one or more of radio resource control signaling, media access control signaling, and downlink control information that are sent by the network device, and then sends a measurement result corresponding to each piece of first indication information to the network device based on the one or more of the radio resource control signaling, the media access control signaling, and the downlink control information.

Specifically, if periodic or semi-periodic reporting is performed, the network device may configure a reporting period and a reporting resource for the terminal device by using the radio resource control signaling and/or the media access control signaling, where the reporting period is greater than or equal to the measurement period. The radio resource control signaling and the media access control signaling belong to higher layer signaling, and the terminal device may send the measured measurement result through higher layer reporting.

If aperiodic reporting is performed, the network device may trigger, by using the downlink control information, reporting of the terminal device, and configure a reporting resource for the terminal device. The terminal device may send the measured measurement result through physical layer reporting.

It can be learned that in the embodiments of the present disclosure, the terminal device may further report the measurement result to the network device periodically, semi-periodically, or aperiodically. In the foregoing manner, if the radio resource control signaling and/or the media access control signaling are/is used, the measurement result may be periodically reported; or if the downlink control information is used, the measurement result may be aperiodically reported. Therefore, practicability and flexibility of the solutions are improved.

In one embodiment, in a sixth implementation of the first aspect of the embodiments of the present disclosure, the terminal device performs signal strength measurement on each measurement resource by using each group of measurement parameters, to obtain a measurement result corresponding to each group of measurement parameters. This process may specifically include the following operations:

First, the terminal device performs signal strength measurement on each measurement resource by using each group of measurement parameters, and then calculates, based on signal strengths on the measurement resource, a linear average power value corresponding to each group of measurement parameters.

Specifically, it is assumed that the first time unit is an OFDM symbol, the measurement resource occupies four OFDM symbols in time domain and occupies six resource blocks in frequency domain, and signal strengths measured in the four OFDM symbols are respectively W1, W2, W3, and W4. In this case, a linear averaging manner of the signal strengths is (W1+W2+W3+W4)/(4×6).

Finally, the terminal device determines, based on a preset power mapping relationship, a measurement result corresponding to the linear average power value, and then reports the measurement result to the network device.

It can be learned that in the embodiments of the present disclosure, the terminal device may obtain a situation of average suffered interference. In the foregoing manner, measurement and analysis are performed on a stationary random process, and increasing a quantity of times of averaging can further reduce a deviation, to improve feasibility and practicability of the solutions.

In one embodiment, in a seventh implementation of the first aspect of the embodiments of the present disclosure, the terminal device performs signal strength measurement on each measurement resource by using each group of measurement parameters, to obtain a measurement result corresponding to each group of measurement parameters. This process may specifically include the following operations:

First, the terminal device performs signal strength measurement on each preset granularity resource in the measurement resource by using each group of measurement parameters, where the preset granularity resource is a predefined granularity resource. Then, the terminal device obtains a signal power corresponding to each preset granularity resource, then selects, as a target signal power, a maximum value from signal powers corresponding to all preset granularity resources, and finally determines, based on a preset power mapping relationship, a measurement result corresponding to a value of the target signal power, and reports the measurement result to the network device.

Specifically, it is assumed that the first time unit is an OFDM symbol, the measurement resource occupies four OFDM symbols in time domain and occupies six RBs in frequency domain, and the preset granularity resource is 1 OFDM×1 RB. Therefore, there are a total of 4×6=24 specified granularity resources. The terminal device may select a maximum value from signal powers corresponding to the 24 granularity resources as the processing result.

It can be learned that in the embodiments of the present disclosure, the terminal device may obtain a situation of strongest interference. In the foregoing manner, signal strength measurement is performed for the situation of strongest interference, so that measurement resources and time can be saved, and practicability and feasibility of the solutions are improved.

A second aspect of the embodiments of the present disclosure provides a signal strength measurement method. The method may include the following operations:

First, a network device sends first indication information to a terminal device, so that the terminal device determines a measurement resource based on the first indication information, where the first indication information includes first sub-information, second sub-information, and third sub-information, the first sub-information is used to indicate a measurement period for measurement, the measurement period includes at least one second time unit, and the second time unit includes at least two first time units. The first time unit may be one sampling point, half a symbol, or one symbol, and the second time unit may be one slot, one mini-slot, or the like.

The third sub-information is used to indicate an offset of a start position of a second time unit for measurement relative to a start position of the measurement period, the second sub-information is used to indicate an offset of a start position of a first time unit for measurement in the measurement period relative to the start position of the second time unit for measurement, and the second time unit usually belongs to a non-downlink time unit. The "non-downlink time unit" includes three types: an "uplink time unit", an "idle time unit", and an "uplink/downlink time unit". The "idle time unit" indicates a time unit in which neither uplink data nor downlink data is transmitted. The "uplink/downlink time unit" indicates some time units that are defined in NR and in which either uplink data or downlink data can be transmitted.

It may be understood that the second sub-information and the third sub-information may be two parameters (or two messages), or may be two fields of a same parameter (or a same message), or may be two pieces of information obtained after a same parameter (or a same message) is interpreted in a predefined manner.

Next, the terminal device may determine the measurement resource based on the first indication information, where the measurement resource is determined in the measurement period based on the start position of the first time unit and the start position of the second time unit. Then, the terminal device performs signal strength measurement, in other words, performs power measurement, on a signal on the measurement resource, and finally reports a measurement result to the network device. Until now, a procedure of signal strength measurement is completed.

In the embodiments of the present disclosure, the signal strength measurement method is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, in a first implementation of the second aspect of the embodiments of the present disclosure, the first indication information further includes measurement duration indication information, the measurement duration indication information indicates measurement duration, and a value of the measurement duration includes one first time unit, two first time units, four first time units, or six first time units. Therefore, the measurement resource is determined in the measurement period based on the start position of the first time unit, the start position of the second time unit, and the measurement duration.

It can be learned that in the embodiments of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, in a second implementation of the second aspect of the embodiments of the present disclosure, the method may further include: sending, by the network device, measurement frequency band indication information to the terminal device, where the measurement frequency band indication information indicates the measurement frequency band indication information, and the measurement frequency band indication information indicates a measurement frequency band.

The measurement frequency band includes a bandwidth part for measurement, a measurement bandwidth, and a frequency domain position; or the measurement frequency band includes only a bandwidth part for measurement and a measurement bandwidth. The measurement bandwidth is less than or equal to a bandwidth of the bandwidth part. The bandwidth part includes a plurality of frequency domain units. Usually, frequency domain resource sizes of all the frequency domain units are the same. The frequency domain position may be determined in some manners, and the frequency domain position is used to indicate at least one target frequency domain unit used for measurement in the bandwidth part. The target frequency domain unit may be several contiguous frequency domain units, or may be several frequency domain units distributed in a comb shape.

In this way, the measurement resource is determined in the measurement period based on the start position of the first time unit, the start position of the second time unit, and the measurement frequency band.

Again, in the embodiments of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, in a third implementation of the second aspect of the embodiments of the present disclosure, alternatively, a plurality of sets of measurement parameters may be used to perform signal strength measurement in a same measurement frequency band. Specifically, the network device sends a plurality of pieces of first indication information to the terminal device, where each piece of first indication information corresponds to one set of measurement parameters. Then, the terminal device determines a plurality of measurement resources based on the plurality of pieces of first indication information, where each piece of first indication information corresponds to one measurement resource. Next, the terminal device performs signal strength measurement on each measurement resource, and obtains a measurement result. Certainly, each measurement result also corresponds to one measurement resource. Finally, the terminal device sends a plurality of measurement results to the network device. In other words, the network device receives the plurality of measurement results sent by the terminal device.

In one embodiment, the terminal device may send some of the plurality of measurement results to the network device. Specifically, only when a measurement result meets a specific condition, for example, only when a measured signal strength exceeds a predefined threshold, the terminal device sends the measurement result to the network device.

It can be learned that in the embodiments of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, in a fourth implementation of the second aspect of the embodiments of the present disclosure, the network device may further send second indication information to the terminal device. In other words, the terminal device receives the second indication information sent by the network device. The second indication information is mainly used to indicate whether to perform measurement and/or reporting on the measurement resource.

Specifically, the second indication information may be indicated as "00", "01", "10", and "11", where "00" indicates that neither measurement nor reporting is performed on a measurement resource, "01" indicates that measurement instead of reporting is performed on a measurement resource, "10" indicates that reporting instead of measurement is performed on a measurement resource, and "11" indicates that both measurement and reporting are performed on the measurement resource.

Certainly, the foregoing second indication information and content indicated by the second indication information are each an example. In actual application, the second indication information and the indication content may alternatively be in another form. This is not limited herein.

It can be learned that in the embodiments of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

In one embodiment, in a fifth implementation of the second aspect of the embodiments of the present disclosure, that the network device receives at least one measurement result sent by the terminal device may include the following operations:

The network device sends one or more of radio resource control signaling, media access control signaling, and downlink control information to the terminal device, and then the terminal device sends a measurement result corresponding to each piece of first indication information to the network device based on the one or more of the radio resource control signaling, the media access control signaling, and the downlink control information.

Specifically, if periodic or semi-periodic reporting is performed, the network device may configure a reporting period and a reporting resource for the terminal device by using the radio resource control signaling and/or the media access control signaling, where the reporting period is greater than or equal to the measurement period. The radio resource control signaling and the media access control signaling belong to higher layer signaling, and the terminal device may send the measured measurement result through higher layer reporting.

If aperiodic reporting is performed, the network device may trigger, by using the downlink control information, reporting of the terminal device, and configure a reporting resource for the terminal device. The terminal device may send the measured measurement result through physical layer reporting.

It can be learned that in the embodiments of the present disclosure, the terminal device may further report the measurement result to the network device periodically, semi-periodically, or aperiodically. In the foregoing manner, if the radio resource control signaling and/or the media access control signaling are/is used, the measurement result may be periodically reported; or if the downlink control information is used, the measurement result may be aperiodically reported. Therefore, practicability and flexibility of the solutions are improved.

A third aspect of the embodiments of the present disclosure provides a signal strength measurement method. The method may include the following operations:

First, a terminal device may receive first indication information sent by a network device, where the first indication information includes first sub-information and second sub-information, the first sub-information is used to indicate a measurement period for measurement, the measurement period includes at least one second time unit, and the second time unit includes at least two first time units. The first time unit may be one sampling point, half a symbol, or one symbol, and the second time unit may be one slot or one mini-slot.

The second sub-information is used to indicate a start position, of a time resource corresponding to a measurement resource, in the measurement period. The measurement resource can be directly and precisely indicated in the measurement period by using the second sub-information. In other words, the measurement resource is determined in the measurement period based on a start position of the first time unit. Next, the terminal device determines the measurement resource based on the first indication information, then performs signal strength measurement, in other words, performs power measurement, on a signal on the measurement resource, and finally reports a measurement result to the network device. Until now, a procedure of signal strength measurement is completed.

In the embodiments of the present disclosure, the signal strength measurement method is provided. The method includes: First, the terminal device receives the first indication information sent by the network device, where the first indication information includes the first sub-information and the second sub-information, the first sub-information is used to indicate the measurement period for measurement, the measurement period includes at least one second time unit, the second time unit includes at least two first time units, and the second sub-information is used to indicate the start position, of the time resource corresponding to the measurement resource, in the measurement period. Next, the terminal device determines the measurement resource based on the first indication information, where the measurement resource is determined in the measurement period based on the start position of the first time unit. Then, the terminal device performs signal strength measurement on the measurement resource, to obtain the measurement result. Finally, the terminal device sends the measurement result to the network device. In the foregoing manner, the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, in a first implementation of the third aspect of the embodiments of the present disclosure, the first indication information further includes measurement duration indication information, the measurement duration indication information indicates measurement duration, and a value of the measurement duration includes one first time unit, two first time units, four first time units, or six first time units. Therefore, the measurement resource is determined in the measurement period based on the start position of the first time unit, a start position of the second time unit, and the measurement duration.

It can be learned that in the embodiments of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, in a second implementation of the third aspect of the embodiments of the present disclosure, the method may further include: receiving, by the terminal device, measurement frequency band indication information sent by the network device, where the measurement frequency band indication information indicates the measurement frequency band indication information, and the measurement frequency band indication information indicates a measurement frequency band.

The measurement frequency band includes a bandwidth part for measurement, a measurement bandwidth, and a frequency domain position; or the measurement frequency band includes only a bandwidth part for measurement and a measurement bandwidth. The measurement bandwidth is less than or equal to a bandwidth of the bandwidth part. The bandwidth part includes a plurality of frequency domain units. Usually, frequency domain resource sizes of all the frequency domain units are the same. The frequency domain position may be determined in some manners, and the frequency domain position is used to indicate at least one target frequency domain unit used for measurement in the bandwidth part. The target frequency domain unit may be several contiguous frequency domain units, or may be several frequency domain units distributed in a comb shape.

In this way, the measurement resource is determined in the measurement period based on the start position of the first time unit, the start position of the second time unit, and the measurement frequency band.

Again, in the embodiments of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, in a third implementation of the third aspect of the embodiments of the present disclosure, the terminal device receives a plurality of pieces of first indication information sent by the network device, where each piece of first indication information corresponds to one set of measurement parameters. Then, the terminal device determines a plurality of measurement resources based on the plurality of pieces of first indication information, where each piece of first indication information corresponds to one measurement resource. Next, the terminal device performs signal strength measurement on each measurement resource, and obtains a measurement result. Certainly, each measurement result also corresponds to one measurement resource. Finally, the terminal device sends a plurality of measurement results to the network device.

In one embodiment, the terminal device may send some of the plurality of measurement results to the network device. Specifically, only when a measurement result meets a specific condition, for example, only when a measured signal strength exceeds a predefined threshold, the terminal device sends the measurement result to the network device.

It can be learned that in the embodiments of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, in a fourth implementation of the third aspect of the embodiments of the present disclosure, the network device may further send second indication information to the terminal device. In other words, the terminal device receives the second indication information sent by the network device. The second indication information is mainly used to indicate whether to perform measurement and/or reporting on the measurement resource.

Specifically, the second indication information may be indicated as "00", "01", "10", and "11", where "00" indicates that neither measurement nor reporting is performed on a measurement resource, "01" indicates that measurement instead of reporting is performed on a measurement resource, "10" indicates that reporting instead of measurement is performed on a measurement resource, and "11" indicates that both measurement and reporting are performed on the measurement resource.

Certainly, the foregoing second indication information and content indicated by the second indication information are each an example. In actual application, the second indication information and the indication content may alternatively be in another form. This is not limited herein.

It can be learned that in the embodiments of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

In one embodiment, in a fifth implementation of the third aspect of the embodiments of the present disclosure, that the terminal device sends at least one measurement result to the network device may include the following operations:

The terminal device receives one or more of radio resource control signaling, media access control signaling, and downlink control information that are sent by the network device, and then sends a measurement result corresponding to each piece of first indication information to the network device based on the one or more of the radio resource control signaling, the media access control signaling, and the downlink control information.

Specifically, if periodic or semi-periodic reporting is performed, the network device may configure a reporting period and a reporting resource for the terminal device by using the radio resource control signaling and/or the media access control signaling, where the reporting period is greater than or equal to the measurement period. The radio resource control signaling and the media access control signaling belong to higher layer signaling, and the terminal device may send the measured measurement result through higher layer reporting.

If aperiodic reporting is performed, the network device may trigger, by using the downlink control information, reporting of the terminal device, and configure a reporting resource for the terminal device. The terminal device may send the measured measurement result through physical layer reporting.

It can be learned that in the embodiments of the present disclosure, the terminal device may further report the measurement result to the network device periodically, semi-periodically, or aperiodically. In the foregoing manner, if the radio resource control signaling and/or the media access control signaling are/is used, the measurement result may be periodically reported; or if the downlink control information is used, the measurement result may be aperiodically reported. Therefore, practicability and flexibility of the solutions are improved.

In one embodiment, in a sixth implementation of the third aspect of the embodiments of the present disclosure, the terminal device performs signal strength measurement on each measurement resource by using each group of measurement parameters, to obtain a measurement result corresponding to each group of measurement parameters. This process may specifically include the following operations:

First, the terminal device performs signal strength measurement on each measurement resource by using each group of measurement parameters, and then calculates, based on signal strengths on the measurement resource, a linear average power value corresponding to each group of measurement parameters.

Specifically, it is assumed that the first time unit is an OFDM symbol, the measurement resource occupies four OFDM symbols in time domain and occupies six resource blocks in frequency domain, and signal strengths measured in the four OFDM symbols are respectively W1, W2, W3, and W4. In this case, a linear averaging manner of the signal strengths is (W1+W2+W3+W4)/(4×6).

Finally, the terminal device determines, based on a preset power mapping relationship, a measurement result corresponding to the linear average power value, and then reports the measurement result to the network device.

It can be learned that in the embodiments of the present disclosure, the terminal device may obtain a situation of average suffered interference. In the foregoing manner, measurement and analysis are performed on a stationary random process, and increasing a quantity of times of averaging can further reduce a deviation, to improve feasibility and practicability of the solutions.

In one embodiment, in a seventh implementation of the third aspect of the embodiments of the present disclosure, the terminal device performs signal strength measurement on each measurement resource by using each group of measurement parameters, to obtain a measurement result corresponding to each group of measurement parameters. This process may specifically include the following operations:

First, the terminal device performs signal strength measurement on each preset granularity resource in the measurement resource by using each group of measurement parameters, where the preset granularity resource is a pre-defined granularity resource. Then, the terminal device obtains a signal power corresponding to each preset granularity resource, then selects, as a target signal power, a maximum value from signal powers corresponding to all preset granularity resources, and finally determines, based on a preset power mapping relationship, a measurement result corresponding to a value of the target signal power, and reports the measurement result to the network device.

Specifically, it is assumed that the first time unit is an OFDM symbol, the measurement resource occupies four OFDM symbols in time domain and occupies six RBs in frequency domain, and the preset granularity resource is 1 OFDM×1 RB. Therefore, there are a total of 4×6=24 specified granularity resources. The terminal device may select a maximum value from signal powers corresponding to the 24 granularity resources as the processing result.

It can be learned that in the embodiments of the present disclosure, the terminal device may obtain a situation of strongest interference. In the foregoing manner, signal strength measurement is performed for the situation of strongest interference, so that measurement resources and time can be saved, and practicability and feasibility of the solutions are improved.

A fourth aspect of the embodiments of the present disclosure provides a signal strength measurement method. The method may include the following operations:

First, a network device sends first indication information to a terminal device, so that the terminal device determines a measurement resource based on the first indication information, where the first indication information includes first sub-information and second sub-information, the first sub-information is used to indicate a measurement period for measurement, the measurement period includes at least one second time unit, and the second time unit includes at least two first time units. The first time unit may be one sampling point, half a symbol, or one symbol, and the second time unit may be one slot or one mini-slot.

The second sub-information is used to indicate a start position, of a time resource corresponding to the measurement resource, in the measurement period. The measurement resource can be directly and precisely indicated in the measurement period by using the second sub-information. In other words, the measurement resource is determined in the measurement period based on a start position of the first time unit. Next, the terminal device determines the measurement resource based on the first indication information, then performs signal strength measurement, in other words, performs power measurement, on a signal on the measurement resource, and finally reports a measurement result to the network device. Until now, a procedure of signal strength measurement is completed.

In the embodiments of the present disclosure, the signal strength measurement method is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, in a first implementation of the fourth aspect of the embodiments of the present disclosure, the first indication information further includes measurement duration indication information, the measurement duration indication information indicates measurement duration, and a value of the measurement duration includes one first time unit, two first time units, four first time units, or six first time units. Therefore, the measurement resource is determined in the measurement period based on the start position of the first time unit, a start position of the second time unit, and the measurement duration.

It can be learned that in the embodiments of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, in a second implementation of the fourth aspect of the embodiments of the present disclosure, the method may further include: sending, by the network device, measurement frequency band indication information to the terminal device, where the measurement frequency band indication information indicates the measurement frequency band indication information, and the measurement frequency band indication information indicates a measurement frequency band.

The measurement frequency band includes a bandwidth part for measurement, a measurement bandwidth, and a frequency domain position; or the measurement frequency band includes only a bandwidth part for measurement and a measurement bandwidth. The measurement bandwidth is less than or equal to a bandwidth of the bandwidth part. The bandwidth part includes a plurality of frequency domain units. Usually, frequency domain resource sizes of all the frequency domain units are the same. The frequency domain position may be determined in some manners, and the frequency domain position is used to indicate at least one target frequency domain unit used for measurement in the bandwidth part. The target frequency domain unit may be several contiguous frequency domain units, or may be several frequency domain units distributed in a comb shape.

In this way, the measurement resource is determined in the measurement period based on the start position of the first time unit, the start position of the second time unit, and the measurement frequency band.

It can be learned that in the embodiments of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, in a third implementation of the fourth aspect of the embodiments of the present disclosure, alternatively, a plurality of sets of measurement parameters may be used to perform signal strength measurement in a same measurement frequency band. Specifically, the network device sends a plurality of pieces of first indication information to the terminal device, where each piece of first indication information corresponds to one set of measurement parameters. Then, the terminal device determines a plurality of measurement resources based on the plurality of pieces of first indication information, where each piece of first indication information corresponds to one measurement resource. Next, the terminal device performs signal strength measurement on a signal on each measurement resource, and obtains a measurement result. Certainly, each measurement result also corresponds to one measurement resource. Finally, the terminal device sends a plurality of measurement results to the network device. In other words, the network device receives the plurality of measurement results sent by the terminal device.

In one embodiment, the terminal device may send some of the plurality of measurement results to the network device. Specifically, only when a measurement result meets a specific condition, for example, only when a measured signal strength exceeds a predefined threshold, the terminal device sends the measurement result to the network device.

It can be learned that in the embodiments of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, in a fourth implementation of the fourth aspect of the embodiments of the present disclosure, the network device may further send second indication information to the terminal device. In other words, the terminal device receives the second indication information sent by the network device. The second indication information is mainly used to indicate whether to perform measurement and/or reporting on the measurement resource.

Specifically, the second indication information may be indicated as "00", "01", "10", and "11", where "00" indicates that neither measurement nor reporting is performed on a measurement resource, "01" indicates that measurement instead of reporting is performed on a measurement resource, "10" indicates that reporting instead of measurement is performed on a measurement resource, and "11" indicates that both measurement and reporting are performed on the measurement resource.

Certainly, the foregoing second indication information and content indicated by the second indication information are each an example. In actual application, the second indication information and the indication content may alternatively be in another form. This is not limited herein.

It can be learned that in the embodiments of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

In one embodiment, in a fifth implementation of the fourth aspect of the embodiments of the present disclosure, that the network device receives at least one measurement result sent by the terminal device may include the following operations:

The network device sends one or more of radio resource control signaling, media access control signaling, and downlink control information to the terminal device, and then the terminal device sends a measurement result corresponding to each piece of first indication information to the network device based on the one or more of the radio resource control signaling, the media access control signaling, and the downlink control information.

Specifically, if periodic or semi-periodic reporting is performed, the network device may configure a reporting period and a reporting resource for the terminal device by using the radio resource control signaling and/or the media access control signaling, where the reporting period is greater than or equal to the measurement period. The radio resource control signaling and the media access control signaling belong to higher layer signaling, and the terminal device may send the measured measurement result through higher layer reporting.

If aperiodic reporting is performed, the network device may trigger, by using the downlink control information, reporting of the terminal device, and configure a reporting resource for the terminal device. The terminal device may send the measured measurement result through physical layer reporting.

It can be learned that in the embodiments of the present disclosure, the terminal device may further report the measurement result to the network device periodically, semi-periodically, or aperiodically. In the foregoing manner, if the radio resource control signaling and/or the media access control signaling are/is used, the measurement result may be periodically reported; or if the downlink control information is used, the measurement result may be aperiodically reported. Therefore, practicability and flexibility of the solutions are improved.

A fifth aspect of the embodiments of the present disclosure provides a terminal device. The terminal device may include:

a receiving module, configured to receive first indication information sent by a network device, where the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;

a determining module, configured to determine a measurement resource based on the first indication information received by the receiving module, where the measurement resource is determined in the measurement period based on the start position of the first time unit and the start position of the second time unit;

an obtaining module, configured to perform signal strength measurement on a signal on the measurement resource determined by the determining module, to obtain a measurement result; and a sending module, configured to send the measurement result obtained by the obtaining module to the network device.

In one embodiment, in a first implementation of the fifth aspect of the embodiments of the present disclosure, the first indication information further includes measurement duration indication information, the measurement duration indication information indicates measurement duration, and a value of the measurement duration includes one first time unit, two first time units, four first time units, or six first time units; and the measurement resource is determined in the measurement period based on the start position of the first time unit, the start position of the second time unit, and the measurement duration.

In one embodiment, in a second implementation of the fifth aspect of the embodiments of the present disclosure, the receiving module is further configured to receive measurement frequency band indication information, where the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit, the start position of the second time unit, and the measurement frequency band.

In one embodiment, in a third implementation of the fifth aspect of the embodiments of the present disclosure, the receiving module is specifically configured to receive a plurality of pieces of first indication information sent by the network device;

the determining module is specifically configured to determine a plurality of measurement resources based on the plurality of pieces of first indication information received by the receiving module, where each piece of first indication information is in a one-to-one correspondence with each measurement resource;

the obtaining module is specifically configured to perform signal strength measurement on signals on the plurality of measurement resources determined by the determining module, to obtain a plurality of measurement results, where each measurement result is in a one-to-one correspondence with each measurement resource; and the sending module is specifically configured to send the plurality of measurement results obtained by the obtaining module to the network device.

In one embodiment, in a fourth implementation of the fifth aspect of the embodiments of the present disclosure, the receiving module is further configured to receive second indication information sent by the network device, where the second indication information is used to indicate whether to perform measurement and/or reporting on the measurement resource.

A sixth aspect of the embodiments of the present disclosure provides a network device. The network device may include:

a sending module, configured to send first indication information to a terminal device, where the first indication information is used by the terminal device to determine a measurement resource, the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; and a receiving module, configured to receive a measurement result sent by the terminal device, where the measurement result is obtained by the terminal device by performing signal strength measurement on the measurement resource.

In one embodiment, in a first implementation of the sixth aspect of the embodiments of the present disclosure, the first indication information further includes measurement duration indication information, the measurement duration indication information indicates measurement duration, and a value of the measurement duration includes one first time unit, two first time units, four first time units, or six first time units; and the measurement resource is determined in the measurement period based on the start position of the first time unit, the start position of the second time unit, and the measurement duration.

In one embodiment, in a second implementation of the sixth aspect of the embodiments of the present disclosure, the sending module is further configured to send measurement frequency band indication information, where the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit, the start position of the second time unit, and the measurement frequency band.

In one embodiment, in a third implementation of the sixth aspect of the embodiments of the present disclosure, the sending module is specifically configured to send a plurality of pieces of first indication information to the terminal device, so that the terminal device determines a plurality of measurement resources based on the plurality of pieces of first indication information, where each piece of first indication information is in a one-to-one correspondence with each measurement resource; and the receiving module is specifically configured to receive a plurality of measurement results sent by the terminal device, where the plurality of measurement results are obtained by the terminal device by performing signal strength measurement on the plurality of measurement resources, and each measurement result is in a one-to-one correspondence with each measurement resource.

In one embodiment, in a fourth implementation of the sixth aspect of the embodiments of the present disclosure, the sending module is further configured to send second indication information to the terminal device, where the second indication information is used to indicate whether to perform measurement and/or reporting on the measurement resource.

A seventh aspect of the embodiments of the present disclosure provides a terminal device. The terminal device may include:

a receiving module, configured to receive first indication information sent by a network device, where the first indication information includes first sub-information and second sub-information, the first sub-information is used to indicate a measurement period for measurement, the measurement period includes at least one second time unit, the second time unit includes at least two first time units, and the second sub-information is used to indicate a start position, of a time resource corresponding to a measurement resource, in the measurement period;

a determining module, configured to determine the measurement resource based on the first indication information received by the receiving module, where the measurement resource is determined in the measurement period based on a start position of the first time unit;

an obtaining module, configured to perform signal strength measurement on a signal on the measurement resource determined by the determining module, to obtain a measurement result; and a sending module, configured to send the measurement result obtained by the obtaining module to the network device.

In one embodiment, in a first implementation of the seventh aspect of the embodiments of the present disclosure, the first indication information further includes measurement duration indication information, the measurement duration indication information indicates measurement duration, and a value of the measurement duration includes one first time unit, two first time units, four first time units, or six first time units; and the measurement resource is determined in the measurement period based on the start position of the first time unit, a start position of the second time unit, and the measurement duration.

In one embodiment, in a second implementation of the seventh aspect of the embodiments of the present disclosure, the receiving module is further configured to receive measurement frequency band indication information, where the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit, the start position of the second time unit, and the measurement frequency band.

In one embodiment, in a third implementation of the seventh aspect of the embodiments of the present disclosure, the receiving module is specifically configured to receive a plurality of pieces of first indication information sent by the network device;

the determining module is specifically configured to determine a plurality of measurement resources based on the plurality of pieces of first indication information received by the receiving module, where each piece of first indication information is in a one-to-one correspondence with each measurement resource;

the obtaining module is specifically configured to perform signal strength measurement on signals on the plurality of measurement resources determined by the determining module, to obtain a plurality of measurement results, where each measurement result is in a one-to-one correspondence with each measurement resource; and the sending module is specifically configured to send the plurality of measurement results obtained by the obtaining module to the network device.

In one embodiment, in a fourth implementation of the seventh aspect of the embodiments of the present disclosure, the receiving module is further configured to receive second indication information sent by the network device, where the second indication information is used to indicate whether to perform measurement and/or reporting on the measurement resource.

An eighth aspect of the embodiments of the present disclosure provides a network device. The network device may include:

a sending module, configured to send first indication information to a terminal device, where the first indication information is used by the terminal device to determine a measurement resource, the first indication information includes first sub-information and second sub-information, the first sub-information is used to indicate a measurement period for measurement, the measurement period includes at least one second time unit, the second time unit includes at least two first time units, the second sub-information is used to indicate a start position, of a time resource corresponding to the measurement resource, in the measurement period, and the measurement resource is determined in the measurement period based on a start position of the first time unit; and a receiving module, configured to receive a measurement result sent by the terminal device, where the measurement result is obtained by the terminal device by performing signal strength measurement on the measurement resource.

In one embodiment, in a first implementation of the eighth aspect of the embodiments of the present disclosure, the first indication information further includes measurement duration indication information, the measurement duration indication information indicates measurement duration, and a value of the measurement duration includes one first time unit, two first time units, four first time units, or six first time units; and the measurement resource is determined in the measurement period based on the start position of the first time unit, a start position of the second time unit, and the measurement duration.

In one embodiment, in a second implementation of the eighth aspect of the embodiments of the present disclosure, the sending module is further configured to send measurement frequency band indication information, where the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit, the start position of the second time unit, and the measurement frequency band.

In one embodiment, in a third implementation of the eighth aspect of the embodiments of the present disclosure, the sending module is specifically configured to send a plurality of pieces of first indication information to the terminal device, so that the terminal device determines a plurality of measurement resources based on the plurality of pieces of first indication information, where each piece of first indication information is in a one-to-one correspondence with each measurement resource; and the receiving module is specifically configured to receive a plurality of measurement results sent by the terminal device, where the plurality of measurement results are obtained by the terminal device by performing signal strength measurement on signals on the plurality of measurement resources, and each measurement result is in a one-to-one correspondence with each measurement resource.

In one embodiment, in a fourth implementation of the eighth aspect of the embodiments of the present disclosure, the sending module is further configured to send second indication information to the terminal device, where the second indication information is used to indicate whether to perform measurement and/or reporting on the measurement resource.

A ninth aspect of the embodiments of the present disclosure provides a terminal device. The terminal device may include a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory, to perform the method according to any implementation of the first aspect.

A tenth aspect of the embodiments of the present disclosure provides a network device, including a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory, to perform the method according to any implementation of the second aspect.

An eleventh aspect of the embodiments of the present disclosure provides a terminal device, including a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory, to perform the method according to any implementation of the third aspect.

A twelfth aspect of the embodiments of the present disclosure provides a network device, including a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate with each other; and the processor is configured to invoke the program and the instruction in the memory, to perform the method according to any implementation of the fourth aspect.

A thirteenth aspect of the embodiments of the present disclosure provides a signal strength measurement system. The signal strength measurement system may include a terminal device and a network device, where the terminal device is the terminal device according to any one of the fifth aspect and the first to the fourth possible implementations of the fifth aspect; and the network device is the network device according to any one of the sixth aspect and the first to the fourth possible implementations of the sixth aspect.

A fourteenth aspect of the embodiments of the present disclosure provides a signal strength measurement system. The signal strength measurement system may include a terminal device and a network device, where the terminal device is the terminal device according to any one of the seventh aspect and the first to the fourth possible implementations of the seventh aspect; and the network device is the network device according to any one of the eighth aspect and the first to the fourth possible implementations of the eighth aspect.

According to a fifteenth aspect, an embodiment of the present disclosure provides a computer device, including: a processor, a memory, a bus, and a communications interface, where the memory is configured to store a computer executable instruction; the processor and the memory are connected by using the bus; and when the computer device runs, the processor executes the computer executable instruction stored in the memory, to enable the computer device to perform the method according to any one of the foregoing aspects.

According to a sixteenth aspect, an embodiment of the present disclosure provides a computer-readable storage medium, configured to store a computer software instruction used in the foregoing method. When the computer software instruction is run on a computer, the computer is enabled to perform the method according to any one of the foregoing aspects.

According to a seventeenth aspect, an embodiment of the present disclosure provides a computer program product including an instruction. When the computer program product is run on a computer, the computer is enabled to perform the method according to any one of the foregoing aspects.

In addition, for technical effects brought by any design manner of the fifth aspect to the seventeenth aspect, refer to technical effects brought by different design manners of the first aspect to the fourth aspect. Details are not described herein again.

It can be learned from the foregoing technical solutions that the embodiments of the present disclosure have the following advantages:

In the embodiments of the present disclosure, the signal strength measurement method is provided. The method includes: First, the terminal device receives the first indication information sent by the network device, where the first indication information includes the first sub-information, the second sub-information, and the third sub-information, the first sub-information is used to indicate the measurement period for measurement, the measurement period includes at least one second time unit, the second time unit includes at least two first time units, the third sub-information is used to indicate the offset of the start position of the second time unit for measurement relative to the start position of the measurement period, and the second sub-information is used to indicate the offset of the start position of the first time unit for measurement in the measurement period relative to the start position of the second time unit for measurement. Next, the terminal device determines the measurement resource based on the first indication information, where the measurement resource is determined in the measurement period based on the start position of the first time unit and the start position of the second time unit. Then, the terminal device performs signal strength measurement on the measurement resource, to obtain the measurement result. Finally, the terminal device sends the measurement result to the network device. In the foregoing manner, the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

BRIEF DESCRIPTION OF EMBODIMENTS

Embodiments of the present disclosure provide a signal strength measurement method, and a related apparatus and system, to enable a network device to more flexibly instruct a terminal device to measure and report a signal strength, so that signal strengths in several symbols in a subframe can be precisely measured. Therefore, more accurate CLI information can be obtained, to improve network transmission quality and a transmission rate during coordinated scheduling.

In the specification, claims, and accompanying drawings of the present disclosure, the terms "first", "second", "third", "fourth", and the like (if existent) are intended to distinguish between similar objects but do not necessarily indicate a specific order or sequence. It should be understood that data termed in such a way are interchangeable in proper circumstances, so that the embodiments of the present disclosure described herein can be implemented in orders except the order illustrated or described herein. Moreover, the terms "include", "contain" and any other variants mean to cover the non-exclusive inclusion, for example, a process, method, system, product, or device that includes a list of operations or units is not necessarily limited to those expressly listed units, but may include other units not expressly listed or inherent to such a process, method, system, product, or device.

It should be understood that the technical solutions in the embodiments of the present disclosure may be applied to a plurality of types of communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS) system, a worldwide interoperability for microwave access (WiMAX) communications system, or a fifth-generation (5G) mobile communications technology. It should be noted that a specific communications system is not limited in the embodiments of the present disclosure.

Figure 1:
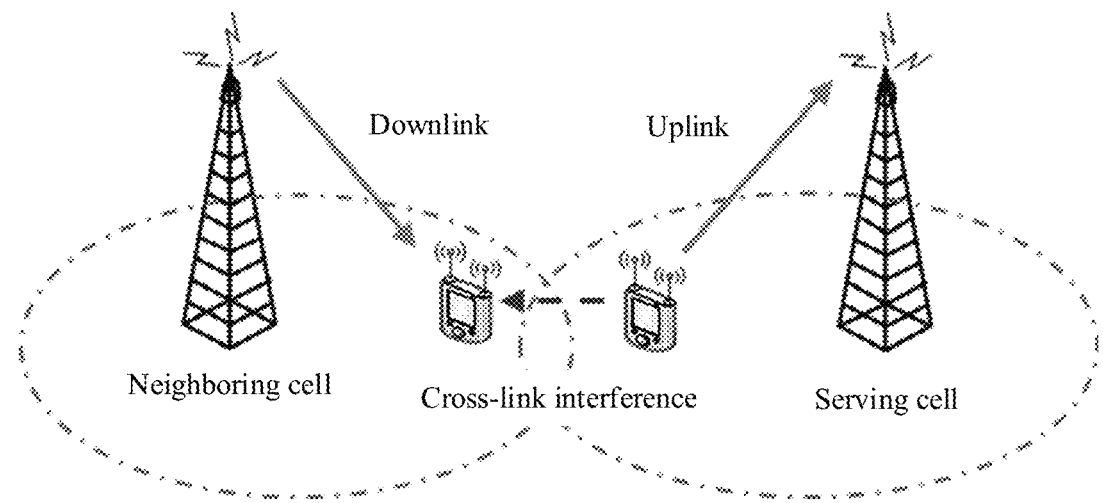
FIG. 1 is a schematic diagram showing that uplink transmission of a serving cell interferes with downlink transmission of a neighboring cell according to an embodiment of the present disclosure.

For ease of understanding, refer to FIG. 1. FIG. 1 is a schematic diagram showing that uplink transmission of a serving cell interferes with downlink transmission of a neighboring cell according to an embodiment of the present disclosure. In a wireless communications system, communication may be classified into different types based on different types of sending nodes and receiving nodes. Usually, sending information to a terminal device by a network device is referred to as downlink (DL) communication, and sending information to a network device by a terminal device is referred to as uplink (UL) communication. In an LTE communications system and a long term evolution-advanced (LTE-A) communications system, for a region within coverage of network devices that use a same operating frequency band and that are geographically close to each other, all cells in the region need to perform uplink communication or downlink communication simultaneously. However, considering that terminal devices in the system are unevenly distributed, communications service volumes are different, and downlink service volumes and uplink service volumes of cells within coverage of a same frequency band vary greatly at the same time, if all the cells use a same uplink and downlink communication configuration, a different service volume requirement of each cell cannot be satisfied.

To improve utilization of network transmission resources, a flexible duplex technology may be used in a new radio access technology (NR) in a fifth-generation wireless communications system. Even for a plurality of neighboring cells that use a same or overlapping frequency band, a communication direction of each cell may be independently configured. For example, each cell may determine, based on a current ratio of uplink services to downlink services of the cell, a ratio of an uplink communication time period to a downlink communication time period of the cell in a relatively long time period, or dynamically adjust a communication type in each time period. However, as shown in FIG. 1, when neighboring serving cells respectively perform uplink and downlink transmission at a same time in a same frequency band, an uplink signal sent by a terminal device in a serving cell may interfere with a downlink signal received by a terminal device in a neighboring cell. That is, CLI between the terminal devices occurs.

Especially in an indoor hotspot scenario or a scenario of dense coverage of small cells, a cell has a relatively small radius, and distances between terminal devices within different cell coverage are relatively small. Consequently, CLI severely affects downlink-signal receiving performance of terminal devices in neighboring cells. To avoid CLI between the terminal devices, two or more neighboring network devices may use a coordinated scheduling method. For example, when a first network device schedules one or more terminal devices served by the first network device to perform downlink transmission, a neighboring second network device does not schedule a second terminal device that suffers strong CLI from the terminal devices within coverage of the first network device. Alternatively, the second terminal device is scheduled to a time-frequency resource of the second network device that has a same transmission direction as that of the first network device, to avoid CLI.

To enable coordinated scheduling between the network devices, each network device needs to learn of in advance information about CLI that a terminal device served within coverage of the network device may suffer. Considering that the network device cannot directly obtain information about a link between terminal devices within different cell coverage, the terminal devices need to perform CLI measurement, and each terminal device obtains CLI information of the terminal device and reports a measurement result to the network device. To enable the terminal device to accurately obtain information about CLI that the terminal may suffer, the network device should configure the terminal device served by the network device to measure a reference signal that can be sent by a terminal device in another cell, for example, a sounding reference signal (SRS) or a demodulation reference signal (DMRS). In an example in which an SRS is sent in an NR system, the SRS may be sent in the last symbol, the last two symbols, or the last four symbols in a slot. Therefore, the network device needs to configure the terminal device to perform CLI measurement at the foregoing possible positions.

The network device may configure the terminal device to: periodically measure a received signal strength in a time period and a frequency band and perform feedback, that is, measure an RSSI, where RSSI measurement is power measurement.

In an RSSI measurement mechanism, the network device may configure RSSI measurement-related parameters for the terminal device by using higher layer signaling. The parameters include a time-domain period, a time-domain measurement subframe offset, time-domain measurement duration, and a frequency-domain measurement bandwidth.

From a perspective of time domain, the RSSI measurement has only a subframe-level offset, and the measurement duration less than a length of one subframe also has only a configurable value of one symbol. Consequently, in a current measurement solution, signal powers in several symbols in a subframe cannot be precisely measured. From a perspective of frequency domain, in existing RSSI measurement, a bandwidth part (BP) or a frequency domain position in a system frequency band in a cell cannot be specified. Consequently, in the current measurement solution, signal power in a specific BP or at a specific frequency domain position in a frequency band cannot be precisely measured.

To obtain more accurate CLI information, a signal strength measurement mechanism is described in the present disclosure. It should be noted that the present disclosure may be applied to not only CLI information measurement, but also co-directional link interference measurement, noise measurement, and the like. In the present disclosure, CLI information measurement is used as an example for description. However, this should not constitute a limitation on the present disclosure.

Embodiment 1: Two-Level Indication

Figure 2:
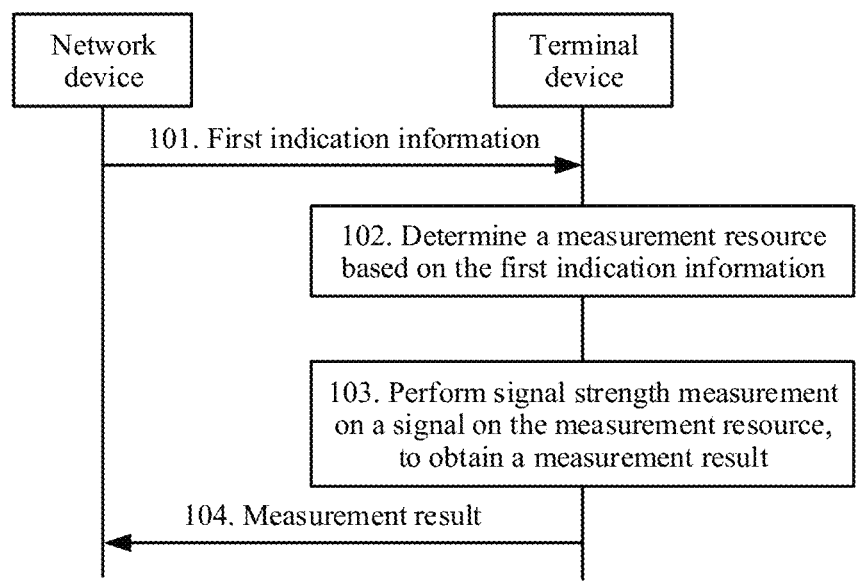
FIG. 2 is a schematic diagram of an embodiment of a signal strength measurement method according to an embodiment of the present disclosure.

FIG. 2 is a schematic diagram of an embodiment of a signal strength measurement method according to an embodiment of the present disclosure. The embodiment of the signal strength measurement method in this embodiment of the present disclosure includes the following operations.

Operation 101. A network device sends first indication information to a terminal device, and the terminal device receives the first indication information sent by the network device, where the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement.

In this embodiment, the network device first sends, to the terminal device, the first indication information including the first sub-information, the second sub-information, and the third sub-information, and the terminal device may determine, based on the received first sub-information, second sub-information, and third sub-information, a resource on which measurement needs to be performed.

Figure 3:
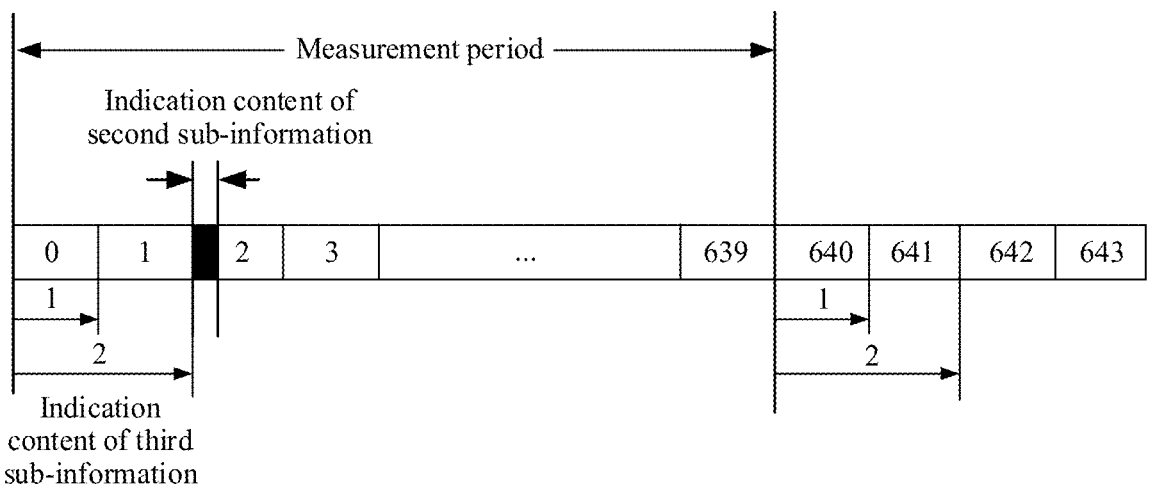
FIG. 3 is a schematic diagram of a measurement period according to an embodiment of the present disclosure.

Specifically, the first sub-information may indicate the measurement period for measurement, the measurement period includes at least one second time unit, and the second time unit includes at least two first time units. In the present disclosure, one measurement period usually includes at least two second time units. In this way, this can help complete a procedure of two-level indication. For ease of understanding, refer to FIG. 3. FIG. 3 is a schematic diagram of one measurement period according to an embodiment of the present disclosure. As shown in the figure, one measurement period may be 640 milliseconds (ms). From a perspective of time domain, a time length of one subframe is 1 ms. In other words, one measurement period may include 640 subframes. Each subframe includes at least one second time unit, and the second time unit includes at least two first time units. It is assumed that the second time unit is represented as a blank grid in FIG. 3, and the first time unit is represented as a black grid in FIG. 3. In this case, third sub-information indicates the offset from the start position of the measurement period to the start position of the second time unit (a counting unit of the offset herein is the second time unit). Using a second time unit numbered 2 as an example, the third sub-information is "2".

The second sub-information indicates the offset of the start position of the first time unit relative to the start position of the second time unit for measurement (a counting unit of the offset herein is the first time unit) in the measurement period. A first time unit corresponding to the black grid is used as an example, and the second time unit for measurement is the second time unit indicated by the number 2. In this case, the first time unit is exactly in the second time unit, and is the $1^{st}$ first time unit in the second time unit. That is, the second sub-information is "0".

It may be understood that, in actual application, the first time unit indicated by the second sub-information may be in the second time unit indicated by the third sub-information, or may not be in the second time unit indicated by the third sub-information. For example, one measurement period includes four second time units, and each second time unit includes three first time units. It is assumed that for the second time unit, an offset value may be 0 or 2, and for the first time unit, an offset value may be 0, 1, 2, 3, 4, or 5. In this case, if the offset value of the second time unit indicated by the third sub-information is 0, and the offset value of the first time unit indicated by the second sub-information is 4, the first time unit indicated by the second sub-information is in a second time unit whose offset value is 1, and is not in the second time unit that is indicated by the third sub-information and whose offset value is 0. For another example, if the offset value of the second time unit indicated by the third sub-information is 0, and the offset value of the first time unit indicated by the second sub-information is 1, the first time unit indicated by the second sub-information is in the second time unit that is indicated by the third sub-information and whose offset value is 0.

Usually, at least one RSSI measurement period needs to be configured to be the same as at least one period of an SRS, and the SRS is periodic or semi-periodic. In this way, the terminal device can measure, in each measurement period, a reference signal sent by another terminal device, and obtain information about a signal strength generated by the another terminal device to the terminal device.

Similarly, a value range of the second time unit corresponds to a time unit in which an interference source terminal device sends an SRS. Specifically, the value range of the second time unit is a slot position corresponding to an uplink slot in a system.

The second time unit may be a slot or a mini-slot. The second time unit belongs to a non-downlink time unit. The "non-downlink time unit" includes three types: an "uplink time unit", an "idle time unit", and an "uplink/downlink time unit". The "idle time unit" indicates a time unit in which neither uplink data nor downlink data is transmitted. The "uplink/downlink time unit" indicates some time units that are defined in NR and in which either uplink data or downlink data can be transmitted.

The first time unit may be an orthogonal frequency division multiplexing (OFDM) symbol or half an OFDM symbol. It may be understood that one OFDM symbol occupies many sampling points in time domain, and a plurality of sampling points form one OFDM symbol. Therefore, theoretically, the first time unit in time domain in the NR system may alternatively be one sampling point, and this sampling point is smaller than one OFDM symbol in time domain.

It may be understood that the second sub-information and the third sub-information may be two parameters (or two messages), or may be two fields of a same parameter (or a same message), or may be two pieces of information obtained after a same parameter (or a same message) is interpreted in a predefined manner.

An example in which two pieces of information are obtained after a same parameter (or a same message) is interpreted in a predefined manner may be: For example, assuming that one parameter (or a message) I is transmitted to a user, the second sub-information and the third sub-information may be obtained through interpretation in the following manner:

TABLE 1

| Value of I | Second sub-information | Third sub-information |
| --- | --- | --- |
| 0 | Symbol 0 | Slot 0 |
| 1 | Symbol 0 | Slot 10 |
| 2 | Symbol 2 | Slot 10 |
| 3 | Symbol 4 | Slot 10 |

An interpretation manner of the parameter (or the message) and the second sub-information and the third sub-information is predefined. The foregoing table is only used as an example, and should not be construed as a limitation on the present disclosure.

Operation 102. The terminal device determines the measurement resource based on the first indication information, where the measurement resource is determined in the measurement period based on the start position of the first time unit and the start position of the second time unit.

In this embodiment, the terminal device determines, based on the first indication information, the measurement resource on which measurement needs to be performed subsequently, where the measurement resource is determined in the measurement period based on both the start position of the first time unit and the start position of the second time unit.

Operation 103. The terminal device performs signal strength measurement on a signal on the measurement resource, to obtain a measurement result.

In this embodiment, each time the signal strength measurement ends, the terminal device may measure a signal strength on an indicated measurement resource. The terminal device may process the measured signal strength, to help measure interference strengths in different measurement resource configurations. A specific processing manner is described as follows:

First Processing Manner: Linear Averaging Method

In a feasible manner, linear averaging is performed on signal strengths measured in a plurality of first time units and a frequency range of a plurality of resource blocks (RB). Specifically, it is assumed that the first time unit is an OFDM symbol, one RB occupies 12 subcarriers in frequency domain, the measurement resource occupies two OFDM symbols in time domain and occupies four RBs in frequency domain, and signal strengths measured in the two OFDM symbols are respectively W1 and W2. In this case, a linear averaging manner of the signal strengths is (W1+W2)/(2×4). In this method, a situation of average interference that the terminal device suffers can be obtained.

Second Processing Manner: Maximum Value Method

In another feasible manner, a maximum value on a specific granularity resource is selected from signal strengths measured in a plurality of first time units and a frequency range of a plurality of RBs. Specifically, it is assumed that the first time unit is an OFDM symbol, one RB occupies 12 subcarriers in frequency domain, a granularity resource is 1 OFDM×1 RB, and the measurement resource occupies two OFDM symbols in time domain and occupies four RBs in frequency domain. Therefore, there are a total of 2×4=8 specified granularity resources. The terminal device may select a maximum value from signal powers corresponding to the eight granularity resources as a processing result. In this method, a situation of strongest interference that the terminal device suffers can be obtained.

In addition, a set of mapping relationships may be predefined between the network device and the terminal device, to indicate a relationship between a measured signal strength and a reported measurement result. Table 2 is a specific example of reporting a measurement result by using a 4-bit binary bit.

TABLE 2

| Binary bit | Reported value | Measurement value | Unit |
|---|---|---|---|
| 0000 | RSSI_00 | RSSI < −100 | dBm |
| 0001 | RSSI_01 | −100 ≤ RSSI < −90 | dBm |
| 0010 | RSSI_02 | −90 ≤ RSSI < −80 | dBm |
| 0011 | RSSI_03 | −80 ≤ RSSI < −70 | dBm |
| 0100 | RSSI_04 | −70 ≤ RSSI < −60 | dBm |
| 0101 | RSSI_05 | −60 ≤ RSSI < −50 | dBm |
| 0110 | RSSI_06 | −50 ≤ RSSI < −40 | dBm |
| 0111 | RSSI_07 | −40 ≤ RSSI < −30 | dBm |
| 1000 | RSSI_08 | −30 ≤ RSSI < −20 | dBm |
| 1001 | RSSI_09 | −20 ≤ RSSI | dBm |

It should be noted that the mapping relationships in Table 2 are only examples. In actual application, another configuration manner may be used. This is not limited herein.

The binary bit in Table 2 is a measurement result. This is because the terminal device usually communicates with the network device by using the binary bit, and the same mapping relationships shown in Table 2 are maintained on both the terminal device side and the network device side. In this way, the two parties can obtain, based on the same mapping relationships, information transmitted by each other. For example, if a signal strength measured by the terminal device is −85 dBm, the terminal device determines, based on the result, to report RSSI_02, that is, sends the binary bit 0010 to the network device.

It may be understood that the foregoing processing operation is performed on a measurement result at each set of configuration parameters.

Operation 104. The terminal device sends the measurement result to the network device, and the network device receives the measurement result sent by the terminal device, where the measurement result is obtained by the terminal device by performing signal strength measurement on a signal on the measurement resource.

In this embodiment, after obtaining the measurement result through processing, the terminal device may send the measurement result to the network device. The network device may be specifically a 5G gNodeB (gNodeB, gNB). Until now, a procedure of signal strength measurement is completed.

The terminal device may periodically or aperiodically send the measurement result to the network device.

Specifically, if periodic or semi-periodic reporting is performed, the network device may configure a reporting period and a reporting resource for the terminal device by using radio resource control (RRC) signaling and/or media access control (MAC) signaling, where the reporting period is greater than or equal to the measurement period. The radio resource control signaling and the media access control signaling belong to higher layer signaling, and the terminal device may send the measured measurement result through higher layer reporting.

If aperiodic reporting is performed, the network device may trigger, by using downlink control information (DCI), reporting of the terminal device, and configure a reporting resource for the terminal device. The terminal device may send the measured measurement result through physical layer reporting.

In this embodiment of the present disclosure, the signal strength measurement method is provided. The method includes: First, the terminal device receives the first indication information sent by the network device, where the first indication information includes the first sub-information, the second sub-information, and the third sub-information, the first sub-information is used to indicate the measurement period for measurement, the measurement period includes at least one second time unit, the second time unit includes at least two first time units, the third sub-information is used to indicate the offset of the start position of the second time unit for measurement relative to the start position of the measurement period, and the second sub-information is used to indicate the offset of the start position of the first time unit for measurement in the measurement period relative to the start position of the second time unit for measurement. Next, the terminal device determines the measurement resource based on the first indication information, where the measurement resource is determined in the measurement period based on the start position of the first time unit and the start position of the second time unit. Then, the terminal device performs signal strength measurement on the measurement resource, to obtain the measurement result. Finally, the terminal device sends the measurement result to the network device. In the foregoing manner, the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on FIG. 2, in a first embodiment of the signal strength measurement method provided in this embodiment of the present disclosure, the first indication information may further include measurement duration indication information, the measurement duration indication information indicates measurement duration, and a value of the measurement duration includes one first time unit, two first time units, four first time units, or six first time units; and the measurement resource is determined in the measurement period based on the start position of the first time unit, the start position of the second time unit, and the measurement duration.

In this embodiment, the measurement duration indication information may be further added to the first indication information. The measurement duration indication information is mainly used to indicate duration required for measurement. Usually, the measurement duration may include one first time unit, two first time units, or four time units.

Figure 4:
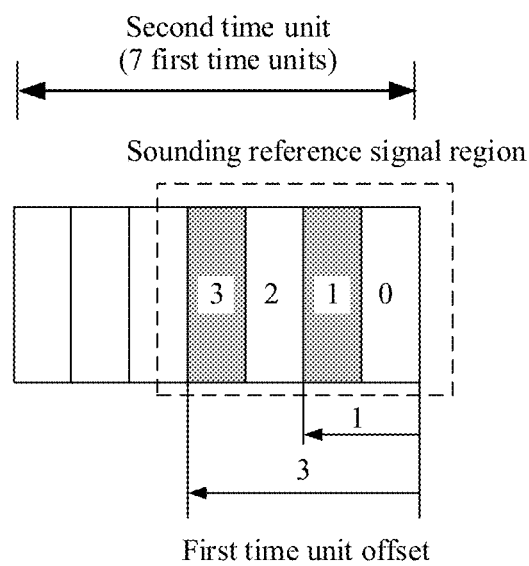
FIG. 4 is a schematic diagram of a first time unit and a second time unit according to an embodiment of the present disclosure.

Specifically, for ease of understanding, refer to FIG. 4. FIG. 4 is a schematic diagram of the first time unit and the second time unit in this embodiment of the present disclosure. As shown in the figure, one second time unit includes seven first time units. It is assumed that the second time unit is a slot, and the first time unit is an OFDM symbol, an SRS is used for signal strength measurement between terminal devices, and a physical layer or a higher layer is used to indicate an OFDM symbol offset, where the OFDM symbol offset is a start position of an OFDM symbol. In addition, the measurement duration indication information is used to indicate the measurement duration, and may include at least one of the last OFDM symbol, the last but one OFDM symbol, the last but two OFDM symbol, and the last but three OFDM symbol in one slot. Compared with indicating the start position in sequence, indicating the start position in reverse sequence may not be affected by a slot configuration or a cyclic prefix (CP) length.

Figure 5:
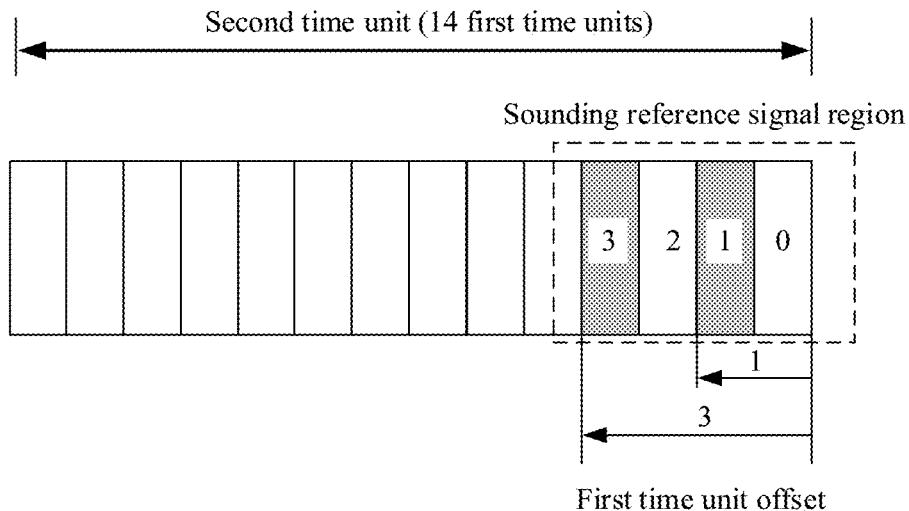
FIG. 5 is another schematic diagram of a first time unit and a second time unit according to an embodiment of the present disclosure.

Similarly, FIG. 5 is another schematic diagram of a first time unit and a second time unit according to an embodiment of the present disclosure. As shown in the figure, one second time unit includes 14 first time units. It is assumed that the second time unit is a slot, and the first time unit is an OFDM symbol, an SRS is used for signal strength measurement between terminal devices, and a physical layer or a higher layer is used to indicate an OFDM symbol offset, where the OFDM symbol offset is a start position of an OFDM symbol. In addition, the measurement duration indication information is used to indicate the measurement duration, and may include at least one of the last OFDM symbol, the last but one OFDM symbol, the last but two OFDM symbol, and the last but three OFDM symbol in one slot.

It may be understood that SRS regions shown in FIG. 4 and FIG. 5 are only examples. In actual application, the measurement duration may further include another quantity of first time units, and a position for sending the SRS is not limited hereto.

Figure 6:
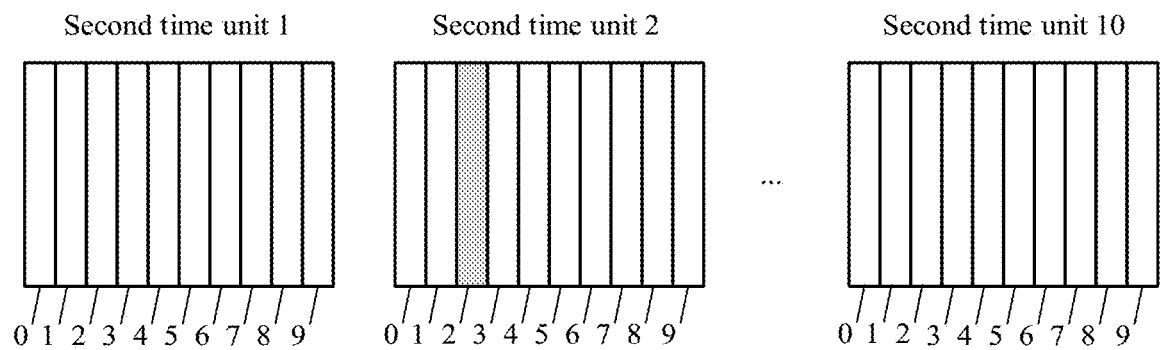
FIG. 6 is a schematic diagram of an embodiment of a two-level indication measurement resource according to Embodiment 1 of the present disclosure.

For ease of understanding, refer to FIG. 6. FIG. 6 is a schematic diagram of an embodiment of a two-level indication measurement resource according to Embodiment 1 of the present disclosure. As shown in the figure, it is assumed that the measurement period is 100 ms, and each 10 ms is one second time unit. In other words, each second time unit includes 10 first time units. Specifically, if the second time unit is a slot, the first time unit may be an OFDM symbol. If a start position from which measurement is expected to start is the $13^{th}$ symbol in 100 symbols, in two-level indication, two operations are required for completing indication. The first operation is indicating that a start time of measurement is in the second slot, to be specific, corresponds to a second time unit 2. The second operation is indicating that the start time of measurement is in the third OFDM symbol in the second slot, to be specific, corresponds to a time unit 2 in the second time unit 2. If the measurement duration indication information is added, a quantity of OFDM symbols occupied for measurement may be further indicated. For example, if the measurement duration is indicated as four symbols, it indicates that a time domain range of the measurement resource is four consecutive symbols.

In addition, in this embodiment of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, based on FIG. 2 or the first embodiment corresponding to FIG. 2, in a second embodiment of the signal strength measurement method provided in this embodiment of the present disclosure, the method may further include: receiving, by the terminal device, measurement frequency band indication information sent by the network device, where the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit, the start position of the second time unit, and the measurement frequency band.

In the embodiments, how to indicate a time domain resource corresponding to the measurement resource is described in the foregoing embodiments, and how to indicate a frequency domain resource corresponding to the measurement resource is described below. To be specific, the terminal device may further receive the measurement frequency band indication information, the measurement frequency band indication information indicates the measurement frequency band, and the measurement frequency band includes the bandwidth part (BP) for measurement, the measurement bandwidth, and the frequency domain position, or the measurement frequency band includes only the BP and BW for measurement. The measurement resource is determined in the measurement period based on the start position of the first time unit, the start position of the second time unit, and the measurement frequency band.

It may be understood that the measurement frequency band indication information may be added to the first indication information, or the measurement frequency band indication information may be added to other information. This is not limited herein.

Figure 7:
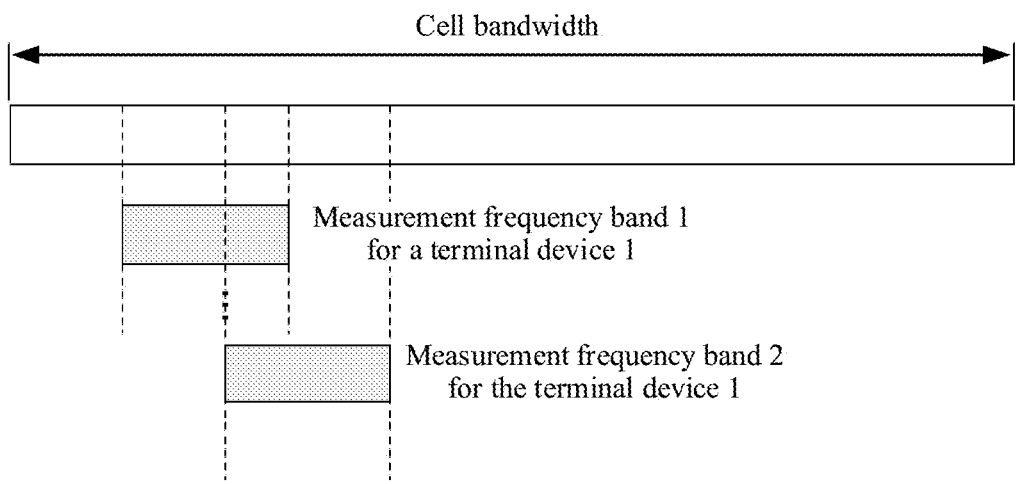
FIG. 7 is a schematic diagram of a measurement frequency band according to an embodiment of the present disclosure.

FIG. 7 is a schematic diagram of a measurement frequency band according to an embodiment of the present disclosure. As shown in the figure, a terminal device 1 and a terminal device 2 may perform signal strength measurement in different measurement frequency bands, and a BP in which the terminal device performs signal strength measurement is a DL BP of the terminal device. If the terminal device operates in a plurality of DL BPs, a plurality of BPs for signal strength measurement may be configured, and time-domain configurations of the plurality of BPs may also be different.

The following specifically describes how to indicate the frequency domain position. In a measurement process, a BP in which the terminal device performs measurement needs to be first indicated, and then a frequency domain configuration result is further determined.

In a first frequency domain position indication manner, a frequency band of one BP is first divided into several frequency domain units. Usually, frequency domain resource sizes of all the frequency domain units are the same. The frequency domain position may be determined in some manners, and the frequency domain position is used to indicate at least one target frequency domain unit used for measurement in the bandwidth part. The target frequency domain units may be several contiguous frequency domain units, or may be several frequency domain units distributed in a comb shape. For example, it is assumed that a comb stage is 2, one in every two frequency domain units belongs to the target frequency domain units, and the target frequency domain units are arranged at an equal interval. For another example, it is assumed that a comb stage is 4, one in every four frequency domain units belongs to the target frequency domain units. Usually, the target frequency domain units are arranged at an equal interval.

Figure 8:
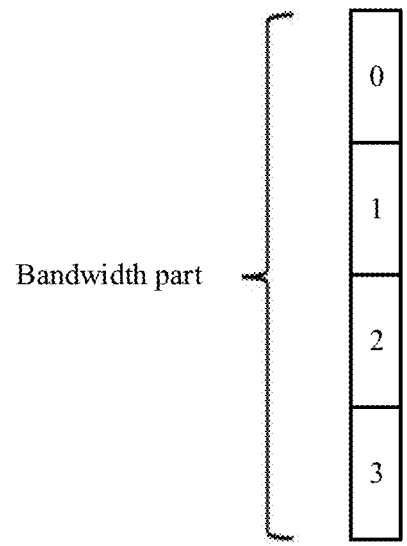
FIG. 8 is a schematic diagram of a bandwidth part of a measurement frequency band according to an embodiment of the present disclosure.

Then, a mapping relationship between an index and at least one frequency domain unit is predefined, and one index value is indicated to the terminal device, to indicate a frequency domain position and a measurement bandwidth in one BP. FIG. 8 is a schematic diagram of a bandwidth part of a measurement frequency band according to an embodiment of the present disclosure. As shown in the figure, it is assumed that one BP is divided into four frequency domain units, and then a mapping relationship between an index and a frequency domain unit is predefined. The mapping relationship is shown in Table 3.

TABLE 3

| Index | Indicated frequency domain unit | Index | Indicated frequency domain unit |
|---|---|---|---|
| 0 | 0 | 1 | 1 |
| 2 | 2 | 3 | 3 |
| 4 | 0, 1 | 5 | 1, 2 |
| 6 | 2, 3 | 7 | 0, 2 |
| 8 | 1, 3 | 9 | 0, 3 |
| 10 | 0, 1, 2 | 11 | 0, 1, 3 |
| 12 | 0, 2, 3 | 13 | 1, 2, 3 |
| 14 | 0, 1, 2, 3 | | |

Figure 9:
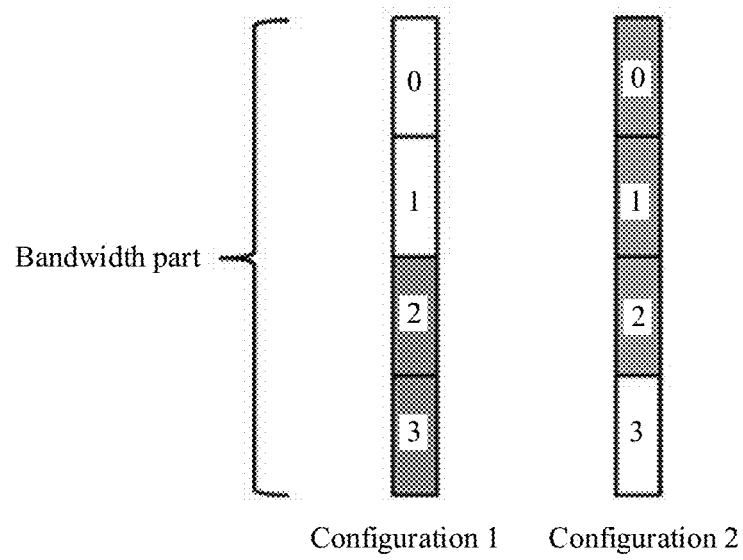
FIG. 9 is a schematic diagram of measurement bandwidths and frequency domain positions in different configurations according to an embodiment of the present disclosure.

Certainly, the mapping relationship shown in Table 3 is only an example, and should not be construed as a limitation on the present disclosure. When frequency domain configuration is performed, only an index value needs to be indicated to the terminal device, and the terminal device can learn of a frequency domain position and a measurement bandwidth for measurement. For ease of understanding, refer to FIG. 9. FIG. 9 is a schematic diagram of measurement bandwidths and frequency domain positions in different configurations according to an embodiment of the present disclosure. With reference to Table 3, assuming that a configuration 1 indicates an index value "6", the configuration 1 indicates a frequency domain unit 2 and a frequency domain unit 3 Assuming that a configuration 2 indicates an index value "10", the configuration 2 indicates a frequency domain unit 0, a frequency domain unit 1, and a frequency domain unit 2.

In a second frequency domain position indication manner, a measurement frequency band is determined by indicating a start position of the measurement frequency band in a BP and indicating a measurement bandwidth of the measurement frequency band in the BP. For example, FIG. 9 is still used as an example. For the configuration 1, the start position is the frequency domain unit 2, and the measurement bandwidth is two frequency domain units. For the configuration 2, the start position is the frequency domain unit 0, and the measurement bandwidth is three frequency domain units.

However, unlike the first frequency domain indication manner that may indicate non-contiguous measurement bandwidths, this indication manner always indicates contiguous measurement frequency bands, for example, the frequency domain unit 0 and the frequency domain unit 1.

In a third frequency domain position indication manner, a position of a measurement frequency band is predefined, and only a bandwidth of the measurement frequency band in a BP is indicated. For example, the position of the measurement frequency band is predefined as a position of a center frequency of the BP. For another example, a start position of the measurement frequency band is predefined as a position of a lowest frequency of the BP, and a measurement bandwidth is indicated. Alternatively, an end position of the measurement frequency band is predefined as a position of a highest frequency of the BP, and a measurement bandwidth is indicated.

Again, in this embodiment of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, based on FIG. 2 and the first or the second embodiment corresponding to FIG. 2, in a third embodiment of the signal strength measurement method provided in this embodiment of the present disclosure, the receiving the first indication information sent by the network device may include:

receiving a plurality of pieces of first indication information sent by the network device;

the determining the measurement resource based on the first indication information may include:

determining a plurality of measurement resources based on the plurality of pieces of first indication information, where each piece of first indication information is in a one-to-one correspondence with each measurement resource;

the performing signal strength measurement on a signal on the measurement resource, to obtain a measurement result may include:

performing signal strength measurement on signals on the plurality of measurement resources, to obtain a plurality of measurement results, where each measurement result is in a one-to-one correspondence with each measurement resource; and the sending the measurement result to the network device may include:

sending the plurality of measurement results to the network device.

In this embodiment, if the first indication information carries the measurement frequency band indication information, refer to Table 4. Table 4 shows two sets of measurement parameters carried in two pieces of first indication information, and the measurement frequency bandwidth indication information may be included in the first indication information.

TABLE 4

| | Measurement parameter 1 | Measurement parameter 2 |
|---|---|---|
| Measurement period | 100 ms | 150 ms |
| First time unit offset | OFDM symbol 2 | OFDM symbol 1 |
| Second time unit offset | Slot 14 | Slot 10 |
| Measurement duration | Four OFDM symbols | Two OFDM symbols |
| Measurement bandwidth | BW 1 | BW 2 |

A measurement result corresponding to each set of measurement parameters may be reported in a respective BP, or may be reported in a same specified BP. This is not limited herein. In other words, the terminal device reports the measurement result to the network device, and the measurement result as to the resource specified by each set of measurement parameters is independently reported. To be specific, an operation such as averaging or summation is not performed on the measurement results as to all the measurement resources. This helps the network device determine a degree of interference that the terminal device suffers on each measurement resource, to perform coordinated scheduling.

In one embodiment, the terminal device may send some of the plurality of measurement results to the network device. Specifically, only when a measurement result meets a specific condition, for example, only when a measured signal strength exceeds a predefined threshold, the terminal device sends the measurement result to the network device.

Further, in this embodiment of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on any one of FIG. 2 and the first to the third embodiments corresponding to FIG. 2, in a fourth embodiment of the signal strength measurement method provided in this embodiment of the present disclosure, the method may further include:

The network device sends second indication information to the terminal device, and the terminal device receives the second indication information sent by the network device, where the second indication information is used to indicate whether to perform measurement and/or reporting on the measurement resource.

In this embodiment, the network device may further send the second indication information to the terminal device. Different from the first indication information, the second indication information is used to indicate whether measurement and/or reporting need/needs to be performed on the measurement resource.

Specifically, Table 5 shows an indication manner of the second indication information.

TABLE 5

| Second indication information | Indication content |
| --- | --- |
| 00 | Neither measurement nor reporting is performed on a measurement resource |
| 01 | Measurement instead of reporting is performed on a measurement resource |
| 10 | Reporting instead of measurement is performed on a measurement resource |
| 11 | Both measurement and reporting are performed on a measurement resource |

It should be noted that the second indication information and the indication content in Table 5 are each an example. In actual application, the second indication information and the indication content may alternatively be in another form. This is not limited herein.

Further, in this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

Figure 10:
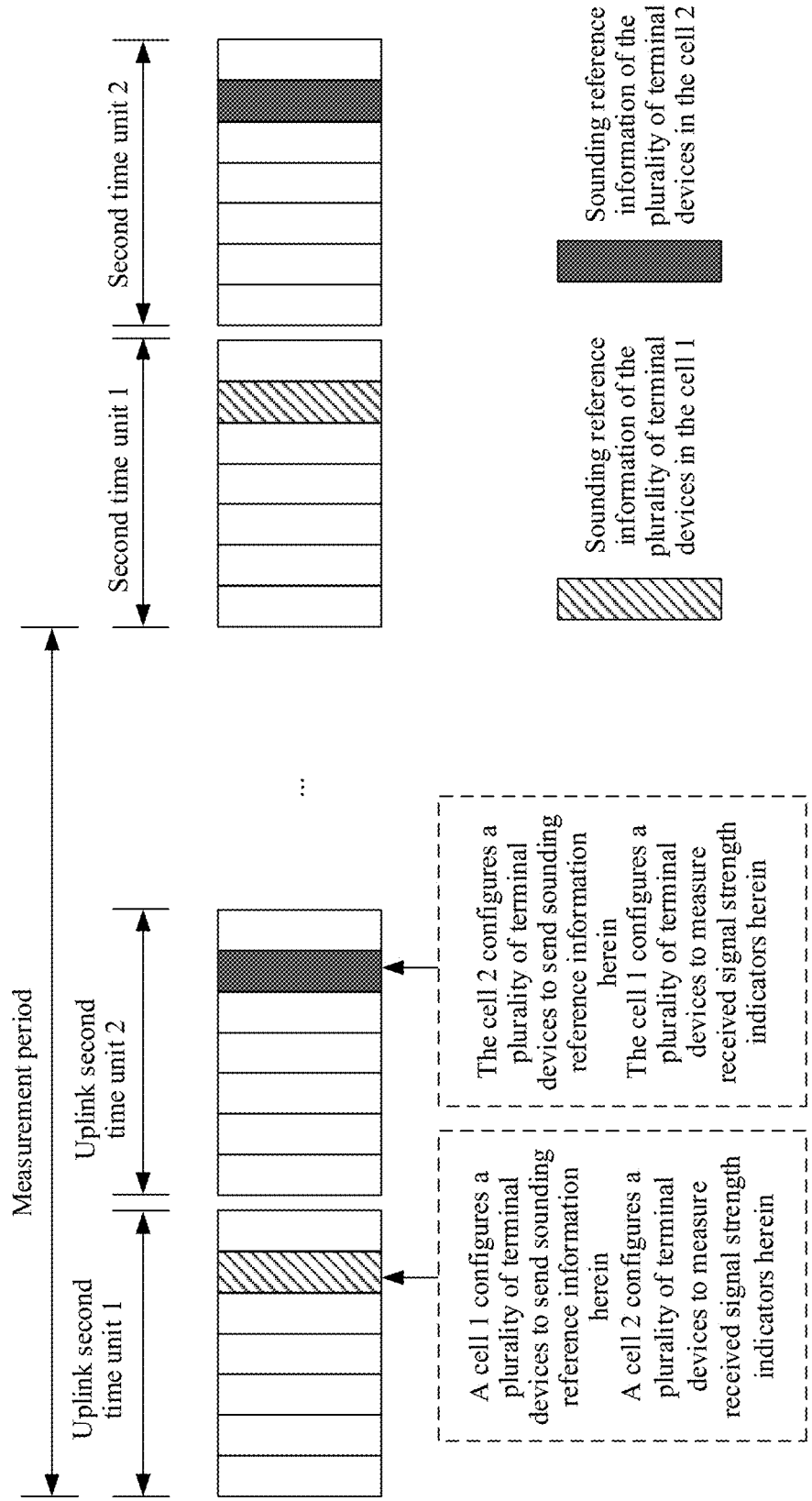
FIG. 10 is a schematic diagram showing that two cells coordinate to perform reference signal sending and signal strength measurement according to an embodiment of the present disclosure.

A cell 1 and a cell 2 coordinate SRS reference signal sending and RSSI measurement, so that terminal devices in the cells can measure CLI of each other. FIG. 10 is a schematic diagram showing that two cells coordinate to perform reference signal sending and signal strength measurement according to an embodiment of the present disclosure. As shown in the figure, it is assumed that one measurement period includes several second time units, and one second time unit includes seven first time units. In the $6^{th}$ first time unit of the $1^{st}$ second time unit, the cell 1 configures a terminal device in the cell 1 to send an SRS, and the cell 2 configures a terminal device in the cell 2 to obtain an RSSI on the resource, so that the terminal device in the cell 2 measures CLI that may be generated by the terminal device in the cell 1. In the $6^{th}$ first time unit of the $2^{nd}$ second time unit, the cell 2 configures the terminal device in the cell 2 to send an SRS, and the cell 1 configures the terminal device in the cell 1 to obtain an RSSI on the resource, so that the terminal device in the cell 1 measures CLI that may be generated by the terminal device in the cell 2.

Figure 11:
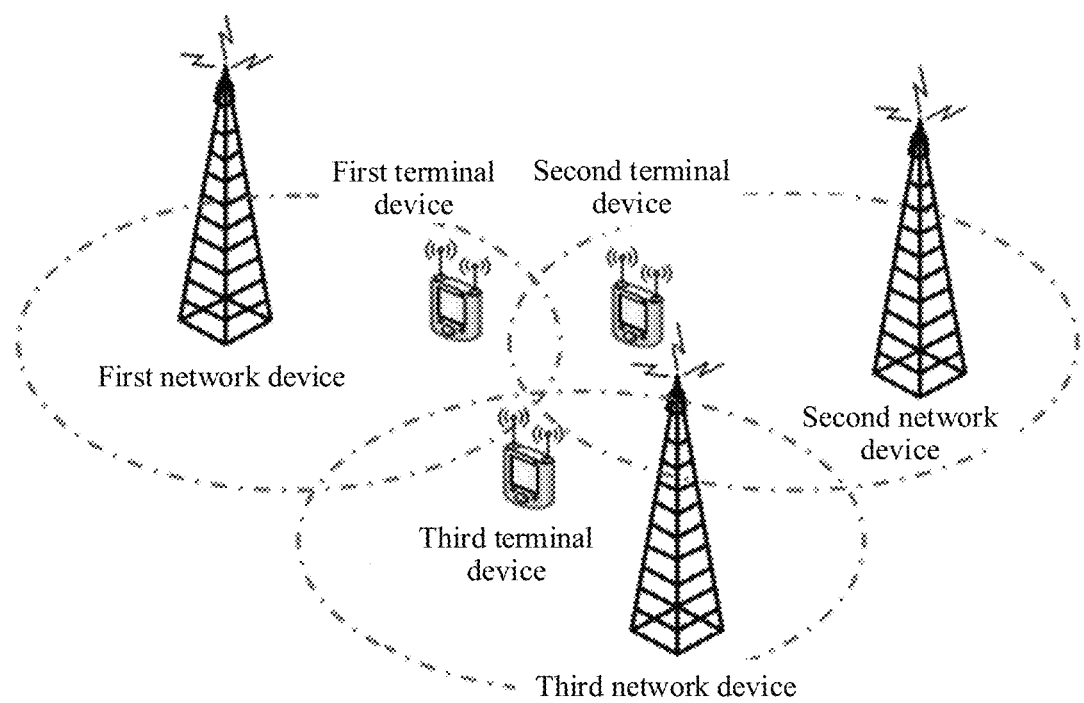
FIG. 11 is a schematic architectural diagram of a signal strength measurement system according to one embodiment of the present disclosure.

For ease of understanding, the following describes in detail a process of signal strength measurement in the present disclosure by using a specific embodiment. The present disclosure is mainly applied to a wireless communications system, and may be specifically applied to a wireless communications system using flexible duplex, for example, an NR system. FIG. 11 is a schematic architectural diagram of a signal strength measurement system according to one embodiment of the present disclosure. As shown in the figure, there is a first terminal device (where one terminal device is used as an example in FIG. 11, or there may be a plurality of terminal devices) within coverage of a first network device, and there are a second network device, a third network device, a second terminal device within coverage of the second network device, and a third terminal device within coverage of the third network device that are near the first network device. In addition, it may be understood that in an actual case, there may be more network devices or fewer network devices. Correspondingly, there may be one or more terminal devices within coverage of each network device. FIG. 11 is only an example, and should not be understood as a limitation on the embodiment.

The network device is an entity that is on a network side and that is configured to transmit a signal or receive a signal. Herein, a gNB is used as an example for description. The terminal device is an entity that is on a user side and that is configured to receive a signal or transmit a signal. Herein, user equipment (UE) is used as an example for description. The following provides descriptions by using an example in which first UE served by a first gNB performs measurement, and second UE served by a second gNB and third UE served by a third gNB sends reference signals.

Specifically, the first gNB sends two pieces of first indication information to the first UE, where each piece of first indication information includes one set of measurement parameters, to respectively instruct the first UE to perform measurement in two BPs in a plurality of downlink BPs of the first UE. The two BPs of the first UE are respectively denoted as a BP 1 and a BP 2, and a measurement period, a first time unit offset, a second time unit offset, measurement duration, and a measurement bandwidth are configured in the BP 1 and the BP 2.

Table 6 shows the two sets of measurement parameters carried in the two pieces of first indication information, and measurement frequency bandwidth indication information may be included in the first indication information.

TABLE 6

|  | Measurement parameter 1 | Measurement parameter 2 |
| --- | --- | --- |
| Measurement period | P1 | P2 |
| First time unit offset | SyO 1 | SyO 2 |
| Second time unit offset | SlO 1 | SlO 2 |
| Measurement duration | MD 1 | MD 2 |
| Measurement bandwidth | BW 1 | BW 2 |

Figure 12:
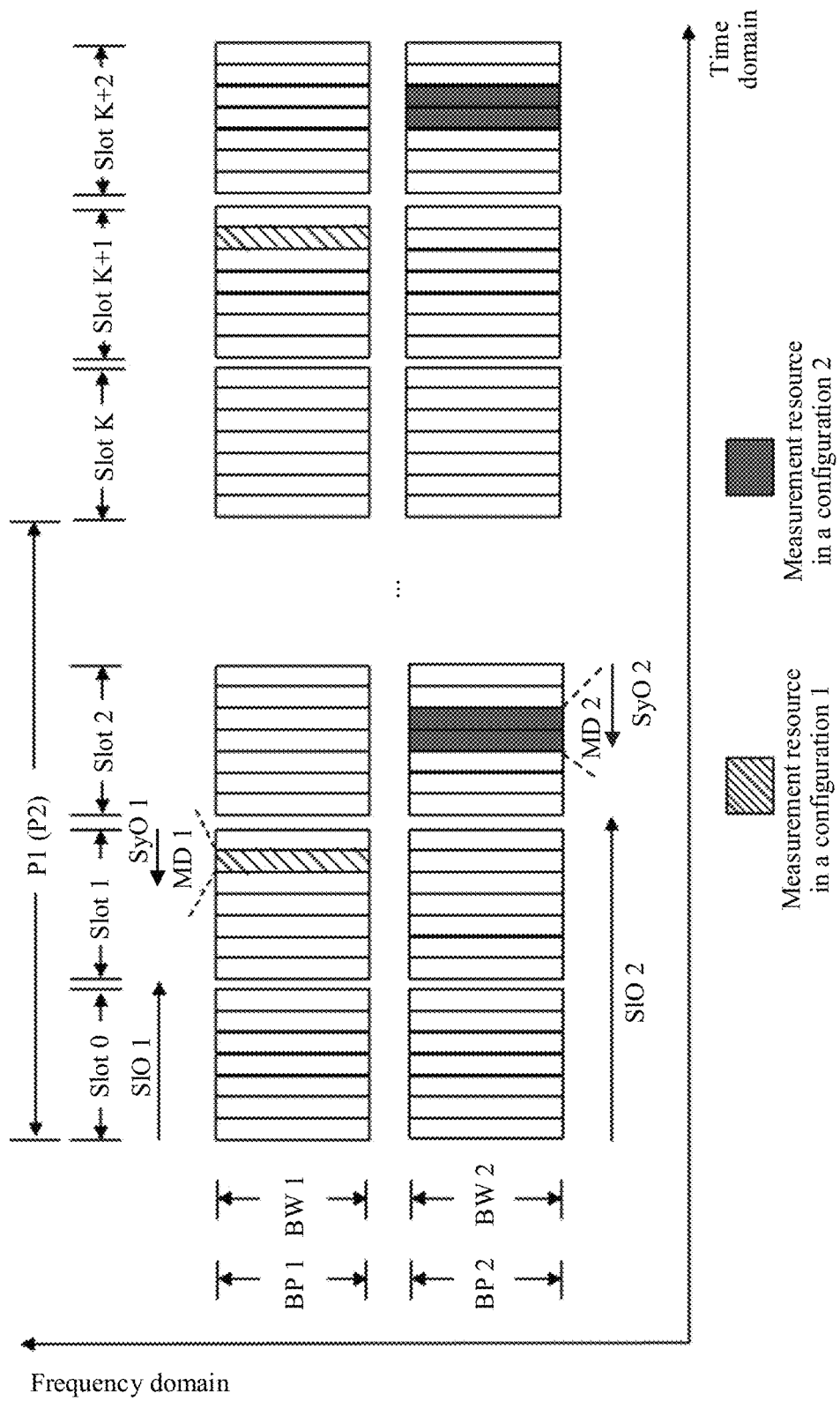
FIG. 12 is a schematic diagram of a two-level indication measurement resource according to one embodiment of the present disclosure.

A measurement resource in each BP may be determined based on the foregoing indication. FIG. 12 is a schematic diagram of a two-level indication measurement resource according to one embodiment of the present disclosure. As shown in the figure, a measurement period in the BP 1 is equal to a measurement period in the BP 2, that is, P1=P2. At least one of configurable values of the measurement period should be equal to at least one of periods available for sending a reference signal (such as an SRS) by the second UE or the third UE. In this way, another gNB (such as the second gNB or the third gNB) may configure, for another UE (such as the second UE or the third UE) within coverage of the another gNB, a reference signal (such as an SRS) that has a same period as the measurement period of the first UE, so that the first UE can measure, in each period, the reference signal sent by the another UE served by the another gNB, to obtain strength information of CLI that is generated to the first UE by the UE served by the another gNB. If a period available for sending an SRS is defined, all UEs using this definition comply with the configuration of the gNB.

For example, in a standard, an SRS period of UE may be {10 ms, 80 ms, 320 ms}, and therefore, the foregoing three SRS periods may be configured for the UE. It is assumed that the first network device may configure 80 ms for the first UE, the second network device may configure 80 ms for the second UE, and so on. Therefore, the configurable period of the RSSI being equal to the SRS period is a prerequisite for accurately measuring the interference each time. In addition, coordinated configuration needs to be performed, for example, periods need to be the same, subframe offsets need to be the same, or frequency domain positions need to be the same. The best case is that the measurement period of the first UE is equal to the sending period of the second UE and the sending period of the third UE. Similarly, the measurement period of the second UE is equal to the sending periods of the first UE and the third UE. The measurement period of the third UE is equal to the sending periods of the first UE and the second UE. The sending periods and measurement periods of the first UE, the second UE, and the third UE are determined by respective gNBs. Therefore, the first gNB, the second gNB, and the third gNB need to negotiate with each other.

A first time unit is a symbol, and the first time unit offset is a symbol offset, or may be another time unit. From a perspective of a time scale, the first time unit offset is less than the second time unit offset. The offset indicates a start position of a symbol level at which the first UE performs measurement in a slot. For example, the SyO 1 in the BP 1 instructs the first UE to start measurement in the last but one symbol in a slot, and the SyO 2 in the BP 2 instructs the first UE to start measurement in the last but three symbol in a slot.

The second time unit is a slot, and the second time unit offset is a slot offset, or may be a subframe or another time unit. The offset indicates a start position of a slot level on which the UE performs measurement in the measurement period. For example, the SlO 1 in the BP 1 instructs the first UE to start measurement in the second slot in the measurement period, and the SlO 2 in the BP 2 instructs the first UE to start measurement in the third slot in the measurement period. A configurable range of the slot offset may be limited to a non-DL slot of the UE that performs measurement. In this way, a slot position that needs to be indicated can be reduced, and indication overheads can be reduced. This is because the UE does not perform uplink sending in a DL slot, CLI strength information measured in the DL slot is not CLI from another UE.

A unit of the measurement duration may be a symbol, or may be another time unit. The duration indicates a time length for which the first UE performs measurement from the start position. For example, the MD 1 in the BP 1 indicates that the measurement duration of the first UE is one symbol, and the MD 2 in the BP 2 indicates that the measurement duration of the first UE is two symbols. The measurement duration includes one, two, four, seven, or 14 symbols.

The measurement bandwidth BW 1 is a bandwidth of the BP 1, and the measurement bandwidth BW 2 is a bandwidth of the BP 2. An optional value of the measurement bandwidth should be a limited quantity of bandwidths not exceeding a bandwidth of the BP. It should be noted that the BP 1 and the BP 2 in FIG. 13 do not overlap in frequency domain, but the BP 1 and the BP 2 may overlap, depending on a configuration made by the first gNB for the first UE. However, regardless of whether BPs of one UE overlap, implementation of the solutions is not affected.

The first gNB may instruct a plurality of UEs within coverage of the first gNB to perform measurement on a same resource (for example, the first gNB instructs the plurality of UEs to measure, on a same resource of the BP 1, CLI from UEs within coverage of the second gNB and the third gNB). Alternatively, a plurality of gNBs may instruct a plurality of UEs within respective coverage to perform measurement on a same resource (for example, the first gNB and the second gNB instruct a plurality of UEs within coverage of the first gNB and the second gNB to measure, on a same resource of the BP 1, CLI from the UE within coverage of the third gNB).

After each time of measurement, the first UE may measure a signal power on an indicated resource. The first UE may process a measurement result, to help measure interference strengths in different measurement resource configurations. A set of mapping relationships may be predefined between the gNB and the UE, to indicate a relationship between a power value of the measurement result and a reported indication value. The processed measurement result of the first UE is reported to the first gNB, and a measurement result as to the resource specified by each set of measurement parameters is independently reported (to be specific, an operation such as averaging or summation is not performed on measurement results as to all resources, to help the first gNB determine a degree of interference to the first UE on each resource, to perform coordinated scheduling).

It should be noted that the network devices such as the first gNB, the second gNB, and the third gNB should coordinate with each other in advance to make sure that the first UE served by the first gNB can measure the CLI. One or more other gNBs than the first gNB configure one or more UEs served by the one or more gNBs to send a reference signal (such as an SRS) on a resource determined through coordination, and the first gNB configures the first UE served by the first gNB to determine a resource and perform measurement on the same measurement resource in the foregoing manner.

Figure 13:
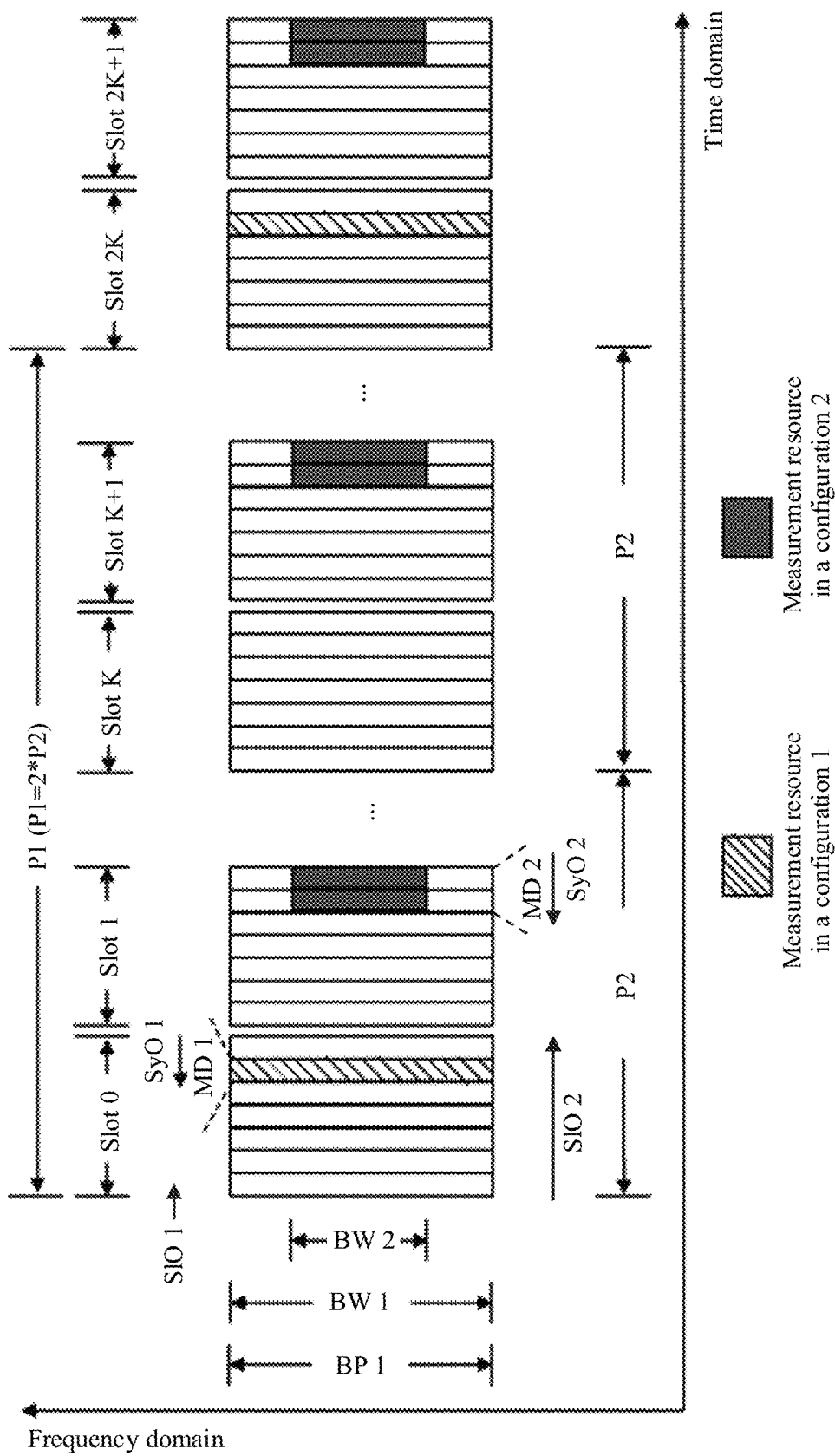
FIG. 13 is another schematic diagram of a two-level indication measurement resource according to one embodiment of the present disclosure.

Specifically, the first gNB may further send a plurality of pieces of first indication information to the first UE. One set of measurement parameters correspond to one piece of indication information. FIG. 13 is another schematic diagram of a two-level indication measurement resource according to one embodiment of the present disclosure. As shown in the figure, two sets of measurement parameters instruct the first UE to perform measurement in a same BP (for example, a BP 1), a measurement period P1 is twice a measurement period P2, and a BW 1 and a BW 2 are different. It can be learned from FIG. 13 that even for a same BP, a plurality of sets of parameters may be configured to implement measurement on different resources. In this manner, interference measurement can be more flexible. For example, the first gNB, the second gNB, and the third gNB negotiate with each other, and the first gNB configures the first UE to separately perform measurement on resources indicated by the configuration 1 and the configuration 2, the second gNB configures the second UE to send a reference signal (such as an SRS) on the resource of the configuration 1, and the third gNB configures the third UE to send a reference signal (such as an SRS) on the resource of the configuration 2. Through measurement, processing, and reporting, the first gNB may learn of CLI that the first UE in the BP suffers from the second UE served by the second gNB, and CLI that the first UE in the BP suffers from the third UE served by the third gNB, so that more effective interference coordination and scheduling can be performed.

Although measurement is performed in the same BP, measurement results measured by using the configuration 1 and the configuration 2 are separately processed and separately reported.

Embodiment 2: One-Level Indication

Figure 14:
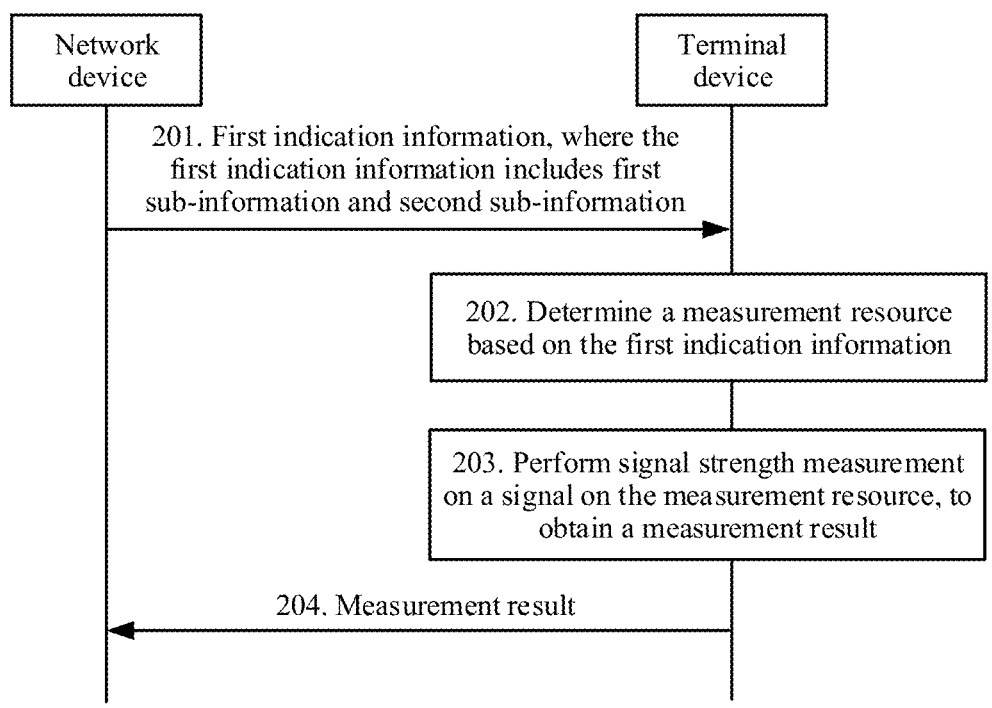
FIG. 14 is a schematic diagram of another embodiment of a signal strength measurement method according to an embodiment of the present disclosure.

FIG. 14 is a schematic diagram of another embodiment of a signal strength measurement method according to an embodiment of the present disclosure. The another embodiment of the signal strength measurement method in this embodiment of the present disclosure includes the following operations.

Operation 201. A network device sends first indication information to a terminal device, and the terminal device receives the first indication information sent by the network device, where the first indication information includes first sub-information and second sub-information, the first sub-information is used to indicate a measurement period for measurement, the measurement period includes at least one second time unit, the second time unit includes at least two first time units, the second time unit belongs to a non-downlink time unit, and the second sub-information is used to indicate a start position, of a time resource corresponding to a measurement resource, in the measurement period.

In this embodiment, the network device first sends, to the terminal device, the first indication information including the first sub-information and the second sub-information, so that the terminal device determines, based on the received first sub-information and second sub-information, a resource on which measurement needs to be performed.

Specifically, the first sub-information may indicate the measurement period for measurement, one measurement period includes at least one second time unit, and one second time unit includes at least two first time units. For example, one measurement period may be 640 ms. From a perspective of time domain, a time length of one subframe is 1 ms. In other words, one measurement period may include 640 subframes. Each subframe includes at least one second time unit.

Usually, at least one RSSI measurement period needs to be configured to be the same as at least one period of an SRS, and the SRS is periodic or semi-periodic. In this way, the terminal device can measure, in each measurement period, reference information sent by another terminal device, and obtain information about a signal strength generated by the another terminal device to the terminal device.

Similarly, a value range of the second time unit corresponds to a time unit in which an interference source terminal device sends an SRS. Specifically, the value range of the second time unit is a slot position corresponding to an uplink slot in a system.

The second time unit may be a slot or a mini-slot. The second time unit belongs to a non-downlink time unit. The "non-downlink time unit" includes three types: an "uplink time unit", an "idle time unit", and an "uplink/downlink time unit". The first time unit may be one OFDM symbol or half an OFDM symbol. It may be understood that one OFDM symbol occupies many sampling points in time domain, and a plurality of sampling points form one OFDM symbol. Therefore, theoretically, the first time unit in time domain in an NR system may alternatively be one sampling point, and this sampling point is smaller than one OFDM symbol in time domain.

In this embodiment, the second sub-information is used to indicate the start position, of the time resource corresponding to the measurement resource, in the measurement period, and specifically, the second sub-information may directly indicate a start position of the first time unit in the measurement period. In other words, a start position of the measurement resource in the second time unit does not need to be first determined, and then a position of the first time unit is found in the second time unit. Instead, the position of the first time unit is positioned at a time.

Operation 202. The terminal device determines the measurement resource based on the first indication information, where the measurement resource is determined in the measurement period based on the start position of the first time unit.

In this embodiment, the terminal device determines, based on the first indication information, the measurement resource on which measurement needs to be performed subsequently, where the measurement resource is determined in the measurement period based on the start position of the first time unit.

Operation 203. The terminal device performs signal strength measurement on a signal on the measurement resource, to obtain a measurement result.

In this embodiment, each time the signal strength measurement ends, the terminal device may measure a signal power on an indicated measurement resource. The terminal device may process the measured signal power, to help measure interference strengths in different measurement resource configurations. A specific processing manner is similar to content of operation 103 in Embodiment 1, and details are not described herein.

Operation 204. The terminal device sends the measurement result to the network device, and the network device receives the measurement result sent by the terminal device.

In this embodiment, after obtaining the measurement result through processing, the terminal device may send the measurement result to the network device. The network device may be specifically a gNB. Until now, a procedure of signal strength measurement is completed. Operation 204 is similar to content of operation 104 in Embodiment 1, and details are not described herein.

In this embodiment of the present disclosure, the signal strength measurement method is provided. The method includes: First, the terminal device receives the first indication information sent by the network device, where the first indication information includes the first sub-information and the second sub-information, the first sub-information is used to indicate the measurement period for measurement, the measurement period includes at least one second time unit, the second time unit includes at least two first time units, and the second sub-information is used to indicate the start position, of the time resource corresponding to the measurement resource, in the measurement period. Next, the terminal device determines the measurement resource based on the first indication information, where the measurement resource is determined in the measurement period based on the start position of the first time unit. Then, the terminal device performs signal strength measurement on the signal on the measurement resource, to obtain the measurement result, and finally sends the measurement result to the network device. In the foregoing manner, the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on FIG. 14, in a first embodiment of the signal strength measurement method provided in this embodiment of the present disclosure, the first indication information may further include measurement duration indication information, the measurement duration indication information indicates measurement duration, and a value of the measurement duration includes one first time unit, two first time units, four first time units, or six first time units; and the measurement resource is determined in the measurement period based on the start position of the first time unit and the measurement duration.

In this embodiment, the measurement duration indication information may be further added to the first indication information. The measurement duration indication information is mainly used to indicate duration required for measurement. Usually, the measurement duration may include one first time unit, two first time units, or four first time units. This embodiment is similar to the first embodiment corresponding to Embodiment 1, and details are not described herein.

Figure 15:
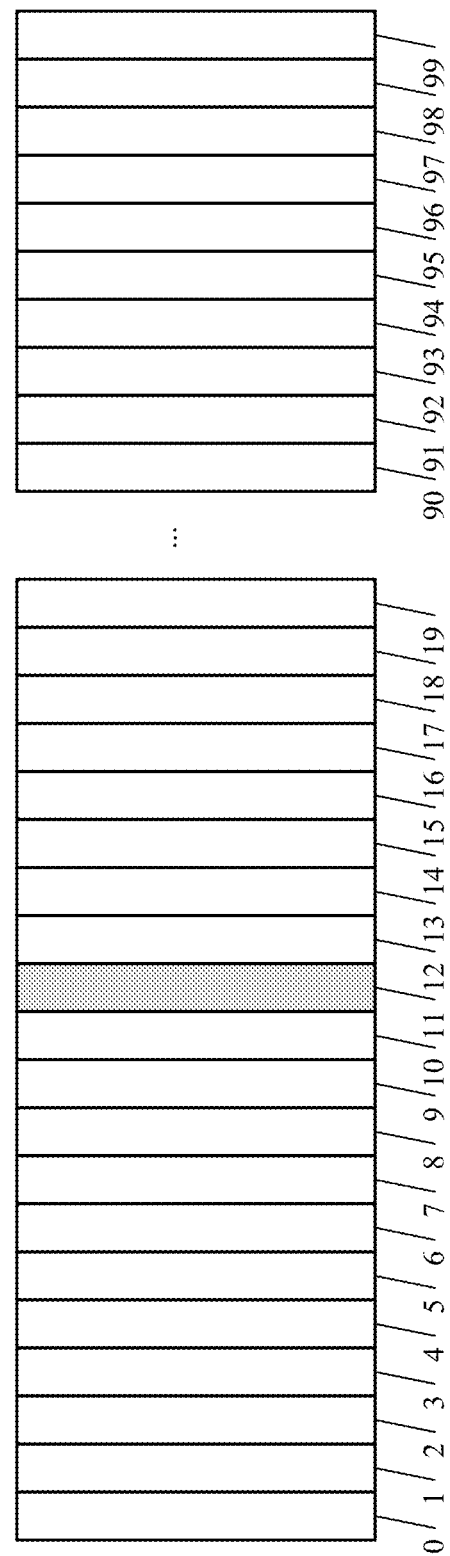
FIG. 15 is a schematic diagram of an embodiment of a one-level indication measurement resource according to Embodiment 2 of the present disclosure.

For ease of understanding, refer to FIG. 15. FIG. 15 is a schematic diagram of an embodiment of a one-level indication measurement resource according to Embodiment 2 of the present disclosure. As shown in the figure, it is assumed that the measurement period is 100 ms, and one measurement period includes 100 first time units. Specifically, the first time unit may be an OFDM symbol. If a start position from which measurement is expected to start is the $13^{th}$ symbol in 100 symbols, in one-level indication, only one operation is required for completing an indication, to be specific, an indication that measurement is performed in the $13^{th}$ OFDM symbol in the measurement period, where the thirteenth OFDM symbol corresponds a position numbered 13 in FIG. 15. If the measurement duration indication information is added, a quantity of OFDM symbols occupied for measurement may be further indicated. For example, "13 4" may be considered as continuously performing measurement in four OFDM symbols from the thirteenth OFDM symbol.

In addition, in this embodiment of the present disclosure, the measurement duration indication information may be further added to the first indication information, the measurement duration indication information indicates the measurement duration, and the value of the measurement duration includes one first time unit, two first time units, four first time units, or six first time units. In the foregoing manner, a quantity of first time units in which the measurement needs to be performed can be accurately determined, so that the measurement is more precise, and feasibility and practicability of the solutions are improved.

In one embodiment, based on FIG. 14 or the first embodiment corresponding to FIG. 14, in a second embodiment of the signal strength measurement method provided in this embodiment of the present disclosure, the method may further include: receiving, by the terminal device, measurement frequency band indication information sent by the network device, where the measurement frequency band indication information indicates the measurement frequency band indication information, and the measurement frequency band indication information indicates a measurement frequency band;

the measurement frequency band includes a bandwidth part for measurement, a measurement bandwidth, and a frequency domain position, the measurement bandwidth is less than or equal to a bandwidth of the bandwidth part, the bandwidth part includes a plurality of frequency domain units, and the frequency domain position indicates a target frequency domain unit used for measurement in the bandwidth part; or the measurement frequency band includes the bandwidth part for measurement and the measurement bandwidth; and the measurement resource is determined in the measurement period based on the start position of the first time unit and the measurement frequency band.

In the embodiments, how to indicate a time domain resource corresponding to the measurement resource is described in the foregoing embodiments, and how to indicate a frequency domain resource corresponding to the measurement resource is described below. To be specific, the first indication information may further include the measurement frequency band indication information, the measurement frequency band indication information indicates the measurement frequency band, and the measurement frequency band includes the bandwidth part (BP) for measurement, the measurement bandwidth (BW), and the frequency domain position, or the measurement frequency band includes only the BP and BW for measurement. The measurement resource is determined in the measurement period based on the start position of the first time unit, the start position of the second time unit, and the measurement frequency band. This embodiment is similar to the second embodiment corresponding to Embodiment 1, and details are not described herein.

Again, in this embodiment of the present disclosure, the first indication information may further include the measurement frequency band indication information, the measurement frequency band indication information indicates the measurement frequency band, and the measurement frequency band includes the bandwidth part for measurement, the measurement bandwidth, and the frequency domain position, or the measurement frequency band includes the bandwidth part for measurement and the measurement bandwidth. The terminal device can more quickly and more accurately determine the measurement resource based on the foregoing indication information, thereby improving practicability of the solutions.

In one embodiment, based on FIG. 14 and the first or the second embodiment corresponding to FIG. 14, in a third embodiment of the signal strength measurement method provided in this embodiment of the present disclosure, the receiving the first indication information sent by the network device may include:

receiving a plurality of pieces of first indication information sent by the network device;

the determining the measurement resource based on the first indication information may include:

determining a plurality of measurement resources based on the plurality of pieces of first indication information, where each piece of first indication information is in a one-to-one correspondence with each measurement resource;

the performing signal strength measurement on the measurement resource, to obtain a measurement result may include:

performing signal strength measurement on the plurality of measurement resources, to obtain a plurality of measurement results, where each measurement result is in a one-to-one correspondence with each measurement resource; and the sending the measurement result to the network device may include:

sending the plurality of measurement results to the network device.

In this embodiment, alternatively, a plurality of sets of measurement parameters may be used to perform signal strength measurement in a same BP. Specifically, the terminal device receives a plurality of pieces of first indication information sent by the network device, and each piece of first indication information corresponds to one set of measurement parameters. Then, the terminal device determines a plurality of measurement resources based on the plurality of pieces of first indication information, where each piece of first indication information corresponds to one measurement resource. Next, the terminal device performs signal strength measurement on each measurement resource, and obtains a measurement result. Certainly, each measurement result also corresponds to one measurement resource. Finally, the terminal device sends a plurality of measurement results to the network device. This embodiment is similar to the third embodiment corresponding to Embodiment 1, and details are not described herein.

Further, in this embodiment of the present disclosure, the network device may configure the plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on any one of FIG. 14 and the first to the third embodiments corresponding to FIG. 14, in a fourth embodiment of the signal strength measurement method provided in this embodiment of the present disclosure, the method may further include:

The network device sends second indication information to the terminal device, and the terminal device receives the second indication information sent by the network device, where the second indication information is used to indicate whether to perform measurement and/or reporting on the measurement resource.

In this embodiment, the network device may further send the second indication information to the terminal device. Different from the first indication information, the second indication information is used to indicate whether measurement and/or reporting need/needs to be performed on the measurement resource. For a specific indication manner, refer to content in the fourth embodiment in Embodiment 1. Details are not described herein again.

Further, in this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

Figure 16:
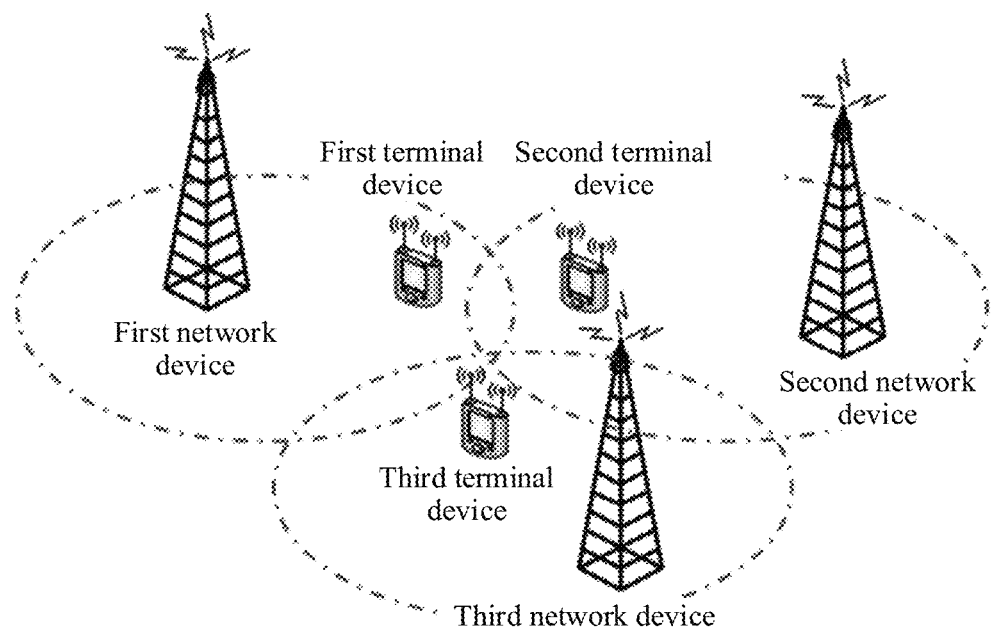
FIG. 16 is another schematic architectural diagram of a signal strength measurement system according to one embodiment of the present disclosure.

For ease of understanding, the following describes in detail a process of signal strength measurement in the present disclosure by using another specific embodiment. The present disclosure is mainly applied to a wireless communications system, and may be specifically applied to a wireless communications system using flexible duplex, for example, an NR system. FIG. 16 is another schematic architectural diagram of a signal strength measurement system according to one embodiment of the present disclosure. As shown in the figure, there is a first terminal device (where one terminal device is used as an example in FIG. 16, or there may be a plurality of terminal devices) within coverage of a first network device, and there are a second network device, a third network device, a second terminal device within coverage of the second network device, and a third terminal device within coverage of the third network device that are near the first network device. In addition, it may be understood that in an actual case, there may be more network devices or fewer network devices. Correspondingly, there may be one or more terminal devices within coverage of each network device. FIG. 16 is only an example, and should not be understood as a limitation on the embodiment.

The network device is an entity that is on a network side and that is configured to transmit a signal or receive a signal. Herein, a gNB is used as an example for description. The terminal device is an entity that is on a user side and that is configured to receive a signal or transmit a signal. Herein, user equipment (UE) is used as an example for description. The following provides descriptions by using an example in which first UE served by a first gNB performs measurement, and second UE served by a second gNB and third UE served by a third gNB sends reference signals.

Specifically, the first gNB sends two pieces of first indication information to the first UE, where each piece of first indication information includes one set of measurement parameters, to respectively instruct the first UE to perform measurement in two BPs in a plurality of downlink BPs of the first UE. The two BPs of the first UE are respectively denoted as a BP 1 and a BP 2, and a measurement period, a first time unit offset, measurement duration, and a measurement bandwidth are configured in the BP 1 and the BP 2. Table 7 shows the two sets of measurement parameters carried in the two pieces of first indication information.

TABLE 7

|  | Measurement parameter 1 | Measurement parameter 2 |
|---|---|---|
| Measurement period | P1 | P2 |
| First time unit offset | SyO 1 | SyO 2 |
| Measurement duration | MD 1 | MD 2 |
| Measurement bandwidth | BW 1 | BW 2 |

Figure 17:
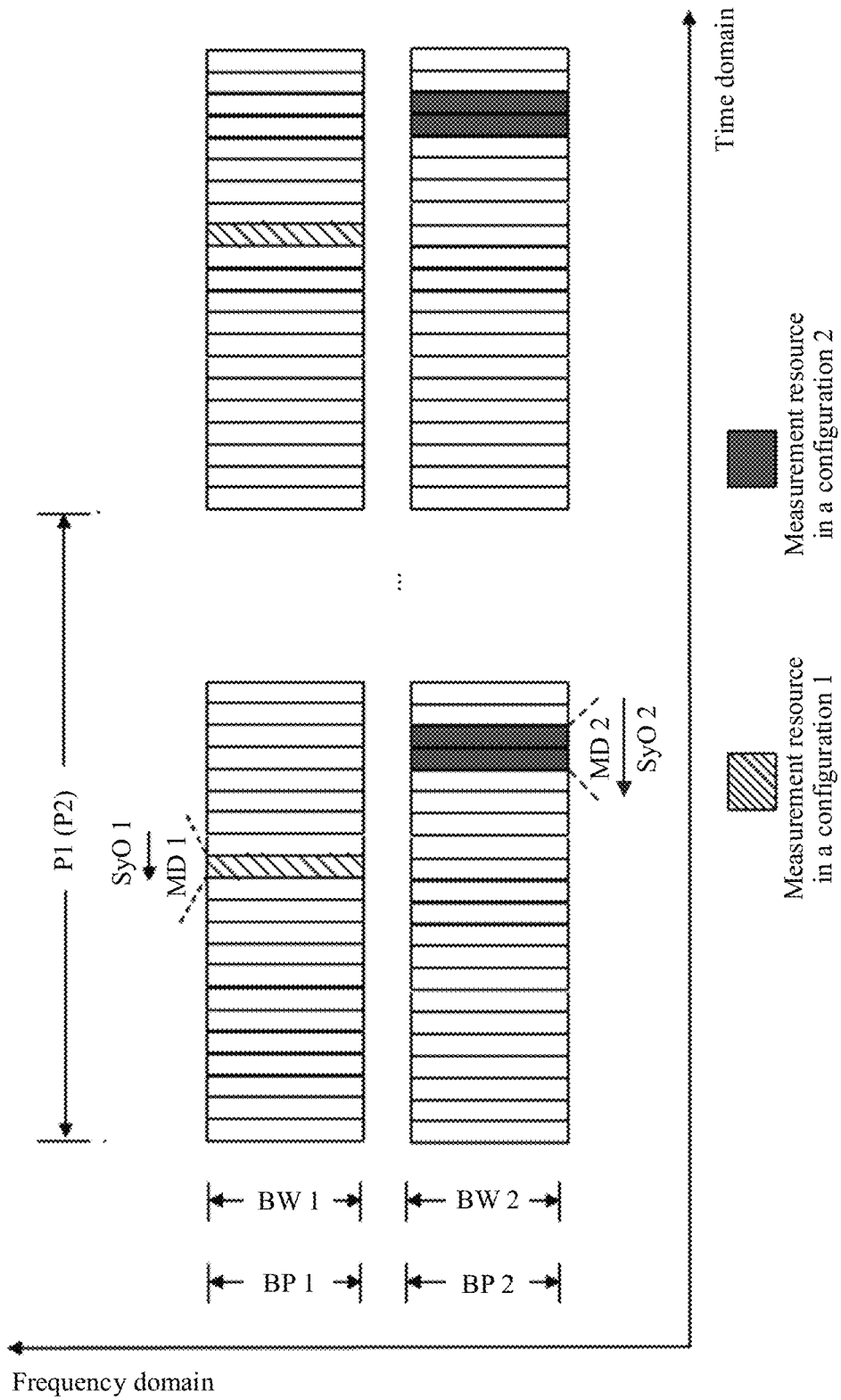
FIG. 17 is a schematic diagram of a one-level indication measurement resource according to one embodiment of the present disclosure.

A measurement resource in each BP may be determined based on the foregoing indication. FIG. 17 is a schematic diagram of a one-level indication measurement resource according to one embodiment of the present disclosure. As shown in the figure, a measurement period in the BP 1 is equal to a measurement period in the BP 2, that is, P1=P2. At least one of configurable values of the measurement period should be equal to at least one of periods available for sending a reference signal (such as an SRS) by the second UE or the third UE. In this way, another gNB (such as the second gNB or the third gNB) may configure, for another UE (such as the second UE or the third UE) within coverage of the another gNB, a reference signal (such as an SRS) that has a same period as the measurement period of the first UE, so that the first UE can measure, in each period, the reference signal sent by the another UE served by the another gNB, to obtain strength information of CLI that is generated to the first UE by the UE served by the another gNB.

A first time unit is a symbol, and the first time unit offset is a symbol offset, or may be another time unit. From a perspective of a time scale, the first time unit offset is less than the second time unit offset. The offset indicates a start position of a symbol level at which the first UE performs measurement in a slot. For example, the SyO 1 in the BP 1 instructs the first UE to start measurement in the thirteenth symbol, and the SyO 2 in the BP 2 instructs the first UE to start measurement in the eighteenth symbol.

A unit of the measurement duration may be a symbol, or may be another time unit. The duration indicates a time length for which the first UE performs measurement from the start position. For example, the MD 1 in the BP 1 indicates that the measurement duration of the first UE is one symbol, and the MD 2 in the BP 2 indicates that the measurement duration of the first UE is two symbols. The measurement duration includes one, two, four, seven, or 14 symbols.

The measurement bandwidth BW 1 is a bandwidth of the BP 1, and the measurement bandwidth BW 2 is a bandwidth of the BP 2. An optional value of the measurement bandwidth should be a limited quantity of bandwidths not exceeding a bandwidth of the BP. It should be noted that the BP 1 and the BP 2 in FIG. 13 do not overlap in frequency domain, but the BP 1 and the BP 2 may overlap depending on a configuration made by the first gNB for the first UE. However, regardless of whether BPs of one UE overlap, implementation of the solutions is not affected.

After each time of measurement, the first UE may measure a signal power on an indicated resource. The first UE may process a measurement result, to help measure interference strengths in different measurement resource configurations. A set of mapping relationships may be predefined between the gNB and the UE, to indicate a relationship between a power value of the measurement result and a reported indication value. The processed measurement result of the first UE is reported to the first gNB, and a measurement result as to the resource specified by each set of measurement parameters is independently reported (to be specific, an operation such as averaging or summation is not performed on measurement results as to all resources, to help the first gNB determine a degree of interference to the first UE on each resource, to perform coordinated scheduling).

Figure 18:
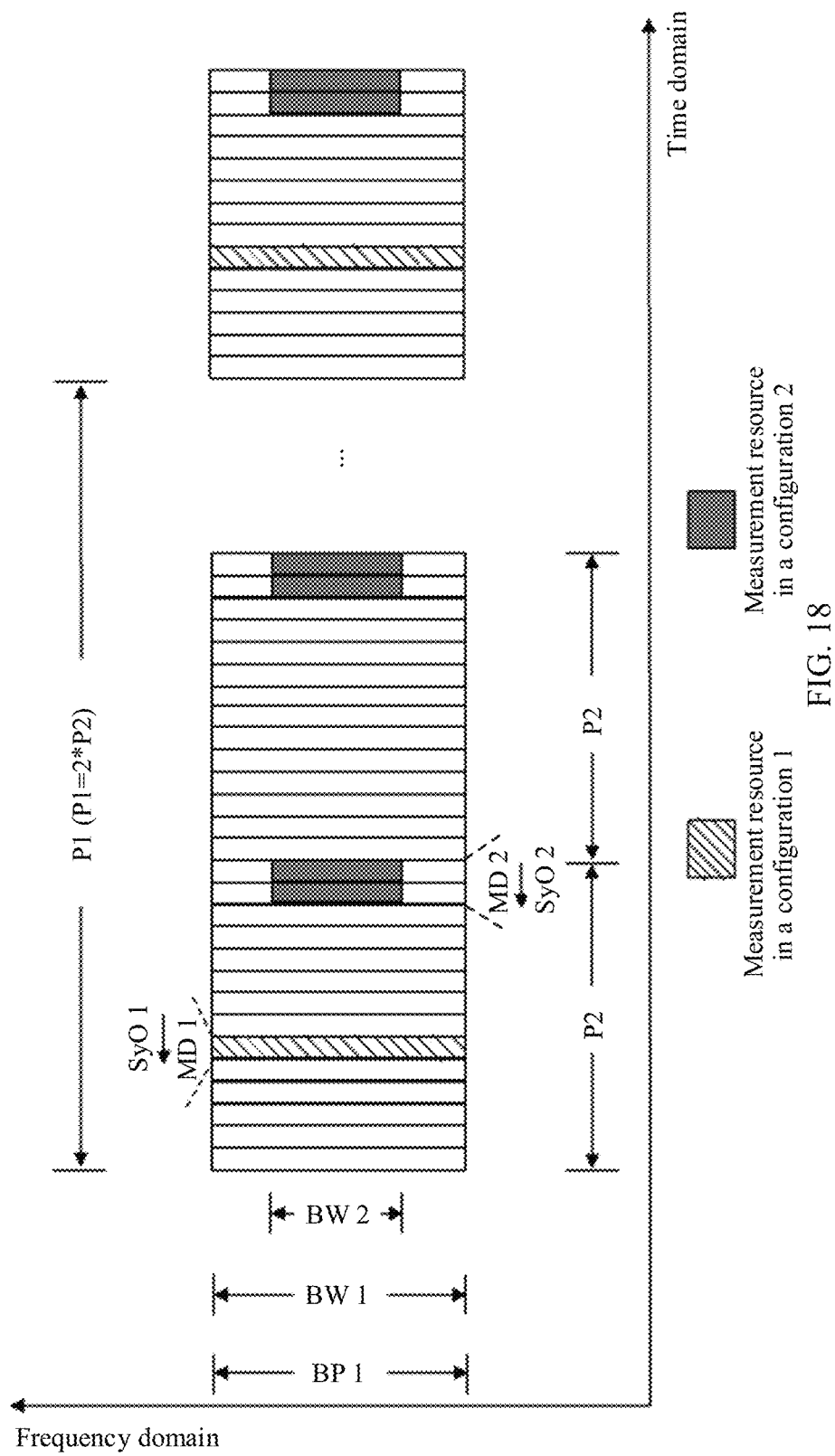
FIG. 18 is another schematic diagram of a one-level indication measurement resource according to one embodiment of the present disclosure.

Specifically, the first gNB may further send a plurality of pieces of first indication information to the first UE. One set of measurement parameters correspond to one piece of indication information. FIG. 18 is another schematic diagram of a one-level indication measurement resource according to one embodiment of the present disclosure. As shown in the figure, two sets of measurement parameters instruct the first UE to perform measurement in a same BP (for example, a BP 1), a measurement period P1 is twice a measurement period P2, and a BW 1 and a BW 2 are different. It can be learned from FIG. 18 that even for a same BP, a plurality of sets of parameters may be configured to implement measurement on different resources. In this manner, interference measurement can be more flexible. For example, the first gNB, the second gNB, and the third gNB negotiate with each other, and the first gNB configures the first UE to separately perform measurement on resources indicated by the configuration 1 and the configuration 2, the second gNB configures the second UE to send a reference signal (such as an SRS) on the resource of the configuration 1, and the third gNB configures the third UE to send a reference signal (such as an SRS) on the resource of the configuration 2. Through measurement, processing, and reporting, the first gNB may learn of CLI that the first UE in the BP suffers from the second UE served by the second gNB, and CLI that the first UE in the BP suffers from the third UE served by the third gNB, so that more effective interference coordination and scheduling can be performed.

Although measurement is performed in the same BP, measurement results measured by using the configuration 1 and the configuration 2 are separately processed and separately reported.

Figure 19:
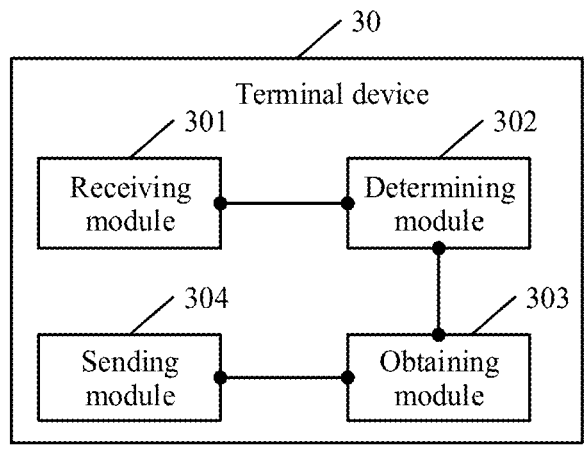
FIG. 19 is a schematic diagram of an embodiment of a terminal device according to an embodiment of the present disclosure.

The following describes in detail a terminal device 30 corresponding to an embodiment of the present disclosure. Referring to FIG. 19, the terminal device 30 in this embodiment of the present disclosure includes:

a receiving module 301, configured to receive first indication information sent by a network device, where the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;

a determining module 302, configured to determine a measurement resource based on the first indication information received by the receiving module 301, where the measurement resource is determined in the measurement period based on the start position of the first time unit and the start position of the second time unit;

an obtaining module 303, configured to perform signal strength measurement on a signal on the measurement resource determined by the determining module 302, to obtain a measurement result; and a sending module 304, configured to send the measurement result obtained by the obtaining module 303 to the network device.

In this embodiment, the receiving module 310 receives the first indication information sent by the network device, where the first indication information includes the first sub-information, the second sub-information, and the third sub-information, the first sub-information is used to indicate the measurement period for measurement, the measurement period includes at least one second time unit, the second time unit includes at least two first time units, the third sub-information is used to indicate the offset of the start position of the second time unit for measurement relative to the start position of the measurement period, and the second sub-information is used to indicate the offset of the start position of the first time unit for measurement in the measurement period relative to the start position of the second time unit for measurement. The determining module 302 determines the measurement resource based on the first indication information received by the receiving module 301, where the measurement resource is determined in the measurement period based on the start position of the first time unit and the start position of the second time unit. The obtaining module 303 performs signal strength measurement on the signal on the measurement resource determined by the determining module 302, to obtain the measurement result. The sending module 304 sends the measurement result obtained by the obtaining module 303 to the network device.

Further, the receiving module 301 is further configured to perform operations such as operation 101 performed by the terminal device in FIG. 2. The determining module 302 may further perform operations such as operation 102 performed by the terminal device in FIG. 2. The obtaining module 303 is further configured to perform operations such as operation 103 performed by the terminal device in FIG. 2. The sending module 304 is further configured to perform operations such as operation 104 performed by the terminal device in FIG. 2. Details are not described herein in this embodiment of the present disclosure.

In this embodiment of the present disclosure, a terminal device is provided. The terminal device receives the first indication information sent by the network device, and the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on the embodiment corresponding to FIG. 19, in another embodiment of the terminal device 30 provided in this embodiment of the present disclosure, the receiving module 301 is specifically configured to receive a plurality of pieces of first indication information sent by the network device;

the determining module 302 is specifically configured to determine a plurality of measurement resources based on the plurality of pieces of first indication information received by the receiving module 301, where each piece of first indication information is in a one-to-one correspondence with each measurement resource;

the obtaining module 303 is specifically configured to perform signal strength measurement on signals on the plurality of measurement resources determined by the determining module 302, to obtain a plurality of measurement results, where each measurement result is in a one-to-one correspondence with each measurement resource; and the sending module 304 is specifically configured to send the plurality of measurement results obtained by the obtaining module 303 to the network device.

In this embodiment of the present disclosure, the network device may configure a plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on the embodiment corresponding to FIG. 19, in another embodiment of the terminal device 30 provided in this embodiment of the present disclosure, the receiving module 301 is further configured to receive second indication information sent by the network device, where the second indication information is used to indicate whether to perform measurement and/or reporting on the measurement resource.

In this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

Figure 20:
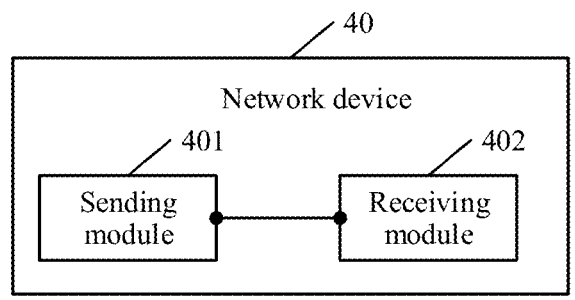
FIG. 20 is a schematic diagram of an embodiment of a network device according to an embodiment of the present disclosure.

The following describes in detail a network device 40 corresponding to an embodiment of the present disclosure. Referring to FIG. 20, the network device 40 in this embodiment of the present disclosure includes:

a sending module 401, configured to send first indication information to a terminal device, where the first indication information is used by the terminal device to determine a measurement resource, the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; and a receiving module 402, configured to receive a measurement result sent by the terminal device, where the measurement result is obtained by the terminal device by performing signal strength measurement on a signal on the measurement resource.

In this embodiment, the sending module 401 sends the first indication information to the terminal device, where the first indication information is used by the terminal device to determine the measurement resource, the first indication information includes the first sub-information, the second sub-information, and the third sub-information, the first sub-information is used to indicate the measurement period for measurement, the measurement period includes at least one second time unit, the second time unit includes at least two first time units, the third sub-information is used to indicate the offset of the start position of the second time unit for measurement relative to the start position of the measurement period, and the second sub-information is used to indicate the offset of the start position of the first time unit for measurement in the measurement period relative to the start position of the second time unit for measurement. The receiving module 402 receives the measurement result sent by the terminal device, where the measurement result is obtained by the terminal device by performing signal strength measurement on the signal on the measurement resource.

Further, the sending module 401 is further configured to perform operations such as operation 101 performed by the network device in FIG. 2. The receiving module 402 may further perform operations such as operation 102 performed by the network device in FIG. 2. Details are not described herein in this embodiment of the present disclosure.

In this embodiment of the present disclosure, a network device is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on the embodiment corresponding to FIG. 20, in another embodiment of the network device 40 provided in this embodiment of the present disclosure, the sending module 401 is specifically configured to send a plurality of pieces of first indication information to the terminal device, so that the terminal device determines a plurality of measurement resources based on the plurality of pieces of first indication information, where each piece of first indication information is in a one-to-one correspondence with each measurement resource; and the receiving module 402 is specifically configured to receive a plurality of measurement results sent by the terminal device, where the plurality of measurement results are obtained by the terminal device by performing signal strength measurement on signals on the plurality of measurement resources, and each measurement result is in a one-to-one correspondence with each measurement resource.

In this embodiment of the present disclosure, the network device may configure a plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on the embodiment corresponding to FIG. 20, in another embodiment of the network device 40 provided in this embodiment of the present disclosure, the sending module 401 is further configured to send second indication information to the terminal device, where the second indication information is used to indicate whether to perform measurement and/or reporting on the measurement resource.

In this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

Figure 21:
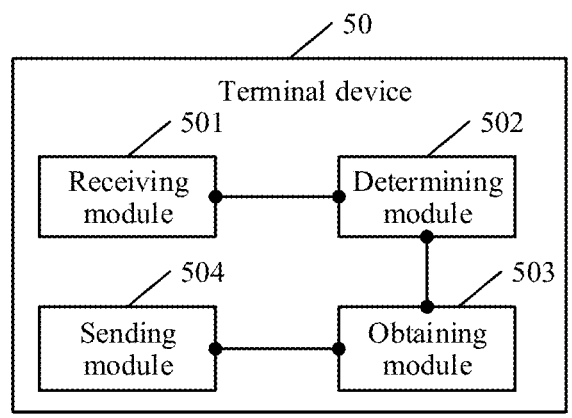
FIG. 21 is a schematic diagram of an embodiment of a terminal device according to an embodiment of the present disclosure.

The following describes in detail a terminal device corresponding to an embodiment of the present disclosure. Referring to FIG. 21, the terminal device 50 in this embodiment of the present disclosure includes:

a receiving module 501, configured to receive first indication information sent by a network device, where the first indication information includes first sub-information and second sub-information, the first sub-information is used to indicate a measurement period for measurement, the measurement period includes at least one second time unit, the second time unit includes at least two first time units, and the second sub-information is used to indicate a start position, of a time resource corresponding to a measurement resource, in the measurement period;

a determining module 502, configured to determine the measurement resource based on the first indication information received by the receiving module 501, where the measurement resource is determined in the measurement period based on a start position of the first time unit;

an obtaining module 503, configured to perform signal strength measurement on a signal on the measurement resource determined by the determining module 502, to obtain a measurement result; and a sending module 504, configured to send the measurement result obtained by the obtaining module 503 to the network device.

In this embodiment, the receiving module 501 receives the first indication information sent by the network device, where the first indication information includes the first sub-information and the second sub-information, the first sub-information is used to indicate the measurement period for measurement, the measurement period includes at least one second time unit, the second time unit includes at least two first time units, and the second sub-information is used to indicate the start position, of the time resource corresponding to the measurement resource, in the measurement period. The determining module 502 determines the measurement resource based on the first indication information received by the receiving module 501, where the measurement resource is determined in the measurement period based on the start position of the first time unit. The obtaining module 503 performs signal strength measurement on the signal on the measurement resource determined by the determining module 502, to obtain the measurement result. The sending module 504 sends the measurement result obtained by the obtaining module 503 to the network device.

Further, the receiving module 501 is further configured to perform operations such as operation 201 performed by the terminal device in FIG. 14. The determining module 502 may further perform operations such as operation 202 performed by the terminal device in FIG. 14. The obtaining module 503 is further configured to perform operations such as operation 203 performed by the terminal device in FIG. 14. The sending module 504 is further configured to perform operations such as operation 504 performed by the terminal device in FIG. 14. Details are not described herein in this embodiment of the present disclosure.

In this embodiment of the present disclosure, a terminal device is provided. The terminal device receives the first indication information sent by the network device, and the network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on the embodiment corresponding to FIG. 21, in another embodiment of the terminal device 50 provided in this embodiment of the present disclosure, the receiving module 501 is specifically configured to receive a plurality of pieces of first indication information sent by the network device;

the determining module 502 is specifically configured to determine a plurality of measurement resources based on the plurality of pieces of first indication information received by the receiving module 501, where each piece of first indication information is in a one-to-one correspondence with each measurement resource;

the obtaining module 503 is specifically configured to perform signal strength measurement on signals on the plurality of measurement resources determined by the determining module 502, to obtain a plurality of measurement results, where each measurement result is in a one-to-one correspondence with each measurement resource; and the sending module 504 is specifically configured to send the plurality of measurement results obtained by the obtaining module 503 to the network device.

Further, in this embodiment of the present disclosure, the network device may configure a plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on the embodiment corresponding to FIG. 21, in another embodiment of the terminal device 50 provided in this embodiment of the present disclosure, the receiving module 501 is further configured to receive second indication information sent by the network device, where the second indication information is used to indicate whether to perform measurement and/or reporting on the measurement resource.

Further, in this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

The following describes in detail a network device corresponding to an embodiment of the present disclosure.

Figure 22:
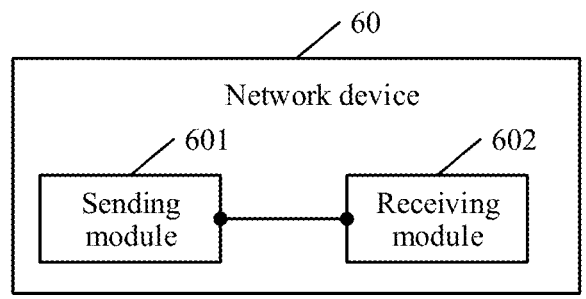
FIG. 22 is a schematic diagram of an embodiment of a network device according to an embodiment of the present disclosure.

Referring to FIG. 22, the network device 60 in this embodiment of the present disclosure includes:

a sending module 601, configured to send first indication information to a terminal device, where the first indication information is used by the terminal device to determine a measurement resource, the first indication information includes first sub-information and second sub-information, the first sub-information is used to indicate a measurement period for measurement, the measurement period includes at least one second time unit, the second time unit includes at least two first time units, the second sub-information is used to indicate a start position, of a time resource corresponding to the measurement resource, in the measurement period, and the measurement resource is determined in the measurement period based on a start position of the first time unit; and a receiving module 602, configured to receive a measurement result sent by the terminal device, where the measurement result is obtained by the terminal device by performing signal strength measurement on the measurement resource.

In this embodiment, the sending module 601 sends the first indication information to the terminal device, where the first indication information is used by the terminal device to determine the measurement resource, the first indication information includes the first sub-information and the second sub-information, the first sub-information is used to indicate the measurement period for measurement, the measurement period includes at least one second time unit, the second time unit includes at least two first time units, the second sub-information is used to indicate the start position, of the time resource corresponding to the measurement resource, in the measurement period, and the measurement resource is determined in the measurement period based on the start position of the first time unit. The receiving module 602 receives the measurement result sent by the terminal device, where the measurement result is obtained by the terminal device by performing signal strength measurement on a signal on the measurement resource.

Further, the sending module 601 is further configured to perform operations such as operation 201 performed by the network device in FIG. 14. The receiving module 602 may further perform operations such as operation 202 performed by the network device in FIG. 14. Details are not described herein in this embodiment of the present disclosure.

In this embodiment of the present disclosure, a network device is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

In one embodiment, based on the embodiment corresponding to FIG. 22, in another embodiment of the network device 60 provided in this embodiment of the present disclosure, the sending module 601 is specifically configured to send a plurality of pieces of first indication information to the terminal device, so that the terminal device determines a plurality of measurement resources based on the plurality of pieces of first indication information, where each piece of first indication information is in a one-to-one correspondence with each measurement resource; and the receiving module 602 is specifically configured to receive a plurality of measurement results sent by the terminal device, where the plurality of measurement results are obtained by the terminal device by performing signal strength measurement on signals on the plurality of measurement resources, and each measurement result is in a one-to-one correspondence with each measurement resource.

Further, in this embodiment of the present disclosure, the network device may configure a plurality of sets of parameters for the terminal device, to instruct the terminal device to perform measurement in one or more measurement frequency bands. The terminal device may perform receiving and measurement on the resources configured by the network device, and report, to the network device, a result measured at each set of configuration parameters. In the foregoing manner, the plurality of sets of parameters can be configured for measurement, and the measurement result corresponding to each parameter is independently reported, thereby improving practicability and flexibility of signal strength measurement.

In one embodiment, based on the embodiment corresponding to FIG. 22, in another embodiment of the network device 60 provided in this embodiment of the present disclosure, the sending module 601 is further configured to send second indication information to the terminal device, where the second indication information is used to indicate whether to perform measurement and/or reporting on the measurement resource.

Further, in this embodiment of the present disclosure, the network device sends the second indication information to the terminal device, where the second indication information is used to indicate whether to perform measurement and/or reporting on the measurement resource. In the foregoing manner, the network device can further control the terminal device to perform reporting and/or measurement, thereby facilitating improvement of operability and feasibility of the solutions.

Figure 23:
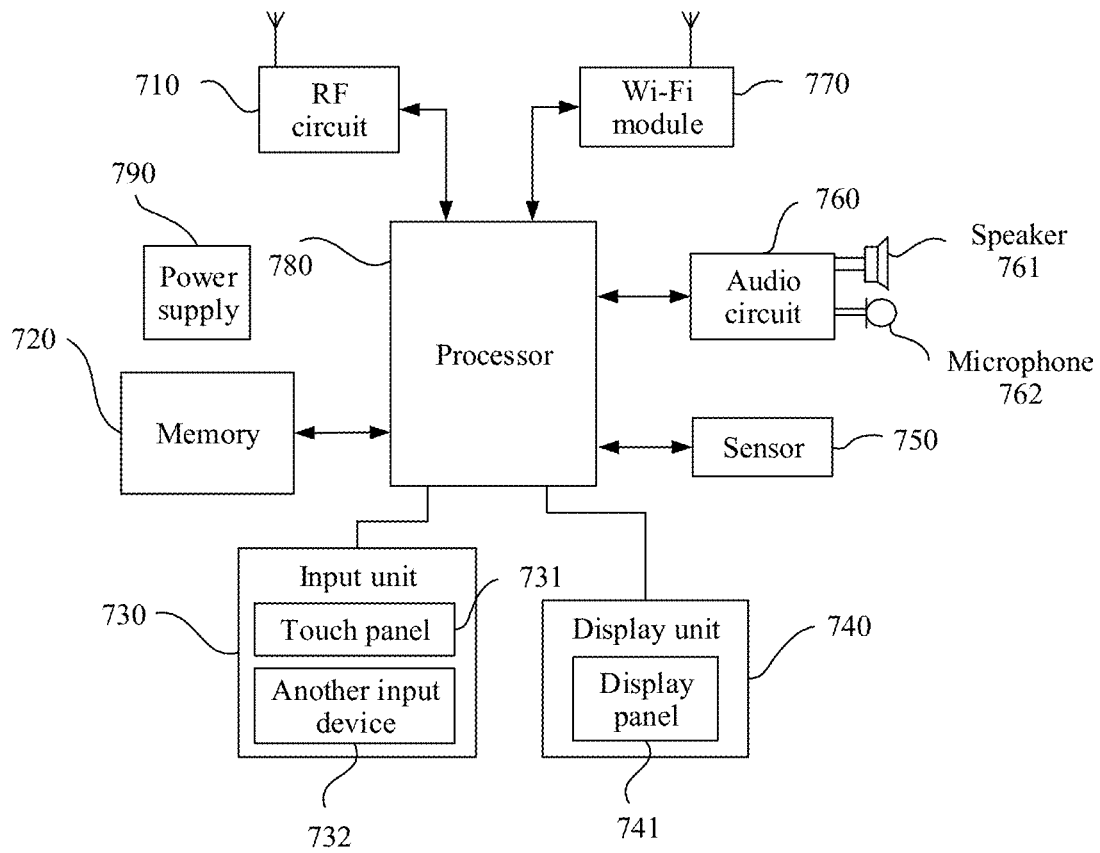
FIG. 23 is a schematic structural diagram of a terminal device according to an embodiment of the present disclosure.

An embodiment of the present disclosure further provides another terminal device, as shown in FIG. 23. For ease of description, only a part related to this embodiment of the present disclosure is shown. For specific technical details that are not disclosed, refer to the method part in the embodiments of the present disclosure. The terminal device may be any terminal device including a mobile phone, a tablet computer, a personal digital assistant (PDA), a point of sales (POS), a vehicle-mounted computer, and the like. For example, the terminal device is a mobile phone.

FIG. 23 is a block diagram of a partial structure of a mobile phone related to the terminal device according to this embodiment of the present disclosure. Referring to FIG. 23, the mobile phone includes components such as a radio frequency (RF) circuit 710, a memory 720, an input unit 730, a display unit 740, a sensor 750, an audio circuit 760, a wireless fidelity (Wi-Fi) module 770, a processor 780, and a power supply 790. A person skilled in the art may understand that, the structure of the mobile phone shown in FIG. 23 does not constitute a limitation on the mobile phone, and the mobile phone may include more or fewer components than those shown in the figure, or some components may be combined, or a different component deployment may be used.

The following describes each constituent component of the mobile phone in detail with reference to FIG. 23.

The RF circuit 710 may be configured to send and receive a signal in an information sending and receiving process or a call process. Particularly, the RF circuit 710 receives downlink information from a base station, then delivers the downlink information to the processor 780 for processing, and sends related uplink data to the base station. The RF circuit 710 usually includes, but is not limited to, an antenna, at least one amplifier, a transceiver, a coupler, a low noise amplifier (LNA), a duplexer, and the like. In addition, the RF circuit 710 may further communicate with a network and another device through wireless communication. Any communication standard or protocol may be used for the wireless communication, including but not limited to GSM, GPRS, CDMA, WCDMA, LTE, an email, a short message service (SMS), and the like.

The memory 720 may be configured to store a software program and a module. The processor 780 runs the software program and the module stored in the memory 720, to perform various function applications and data processing of the mobile phone. The memory 720 may mainly include a program storage area and a data storage area. The program storage area may store an operating system, an application program required by at least one function (for example, a sound play function and an image play function), and the like. The data storage area may store data (for example, audio data and an address book) created based on use of the mobile phone, and the like. In addition, the memory 720 may include a high-speed random access memory, and may further include a nonvolatile memory, for example, at least one magnetic disk storage device, a flash memory device, or another volatile solid-state storage device.

The input unit 730 may be configured to: receive entered digital or character information, and generate key signal input related to user setting and function control of the mobile phone. Specifically, the input unit 730 may include a touch panel 731 and another input device 732. The touch panel 731, also referred to as a touchscreen, may collect a touch operation (for example, an operation performed by a user on or near the touch panel 731 by using any proper object or accessory such as a finger or a stylus) performed by the user on or near the touch panel 731, and drive a corresponding connection apparatus based on a preset program. In one embodiment, the touch panel 731 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 780, and can receive and perform a command sent by the processor 780. Moreover, the touch panel 731 may be implemented in a plurality of types such as a resistive type, a capacitive type, an infrared type, and a surface acoustic wave type. The input unit 730 may include the another input device 732 in addition to the touch panel 731. Specifically, the another input device 732 may include, but is not limited to, one or more of a physical keyboard, a function key (such as a volume control key or an on/off key), a trackball, a mouse, a joystick, or the like.

The display unit 740 may be configured to display information entered by the user or information provided for the user, and various menus of the mobile phone. The display unit 740 may include a display panel 741. In one embodiment, the display panel 741 may be configured in a form of a liquid crystal display (LCD), an organic light-emitting diode (OLED), or the like. Further, the touch panel 731 may cover the display panel 741. When detecting the touch operation on or near the touch panel 731, the touch panel 731 transmits the touch operation to the processor 780 to determine a type of a touch event, and then the processor 780 provides a corresponding visual output on the display panel 741 based on the type of the touch event. In FIG. 23, the touch panel 731 and the display panel 741 are used as two independent components to implement input and output functions of the mobile phone. However, in some embodiments, the touch panel 731 and the display panel 741 may be integrated to implement the input and output functions of the mobile phone.

The mobile phone may further include at least one sensor 750, for example, a light sensor, a motion sensor, and another sensor. Specifically, the optical sensor may include an ambient light sensor and a proximity sensor. The ambient light sensor may adjust luminance of the display panel 741 based on brightness of ambient light. The proximity sensor may turn off the display panel 741 and/or backlight when the mobile phone approaches an ear. As a type of motion sensor, an accelerometer sensor may detect values of acceleration in all directions (usually, three axes), may detect a value and a direction of gravity when the accelerometer sensor is static, and may be used in an application for identifying a mobile phone posture (such as screen switching between a landscape mode and a portrait mode, a related game, or magnetometer posture calibration), a function related to vibration identification (such as a pedometer or a strike), and the like. For another sensor such as a gyroscope, a barometer, a hygrometer, a thermometer, or an infrared sensor that may be further configured in the mobile phone, details are not described herein.

The audio circuit 760, a speaker 761, and a microphone 762 may provide an audio interface between the user and the mobile phone. The audio circuit 760 may convert received audio data into an electrical signal, and transmit the electrical signal to the speaker 761, and the speaker 761 converts the electrical signal into a sound signal for output. In addition, the microphone 762 converts a collected sound signal into an electrical signal. The audio circuit 760 receives the electrical signal, converts the electrical signal into audio data, and then outputs the audio data to the processor 780 for processing. The processor 780 sends the audio data to, for example, another mobile phone by using the RF circuit 710, or outputs the audio data to the memory 720 for further processing Wi-Fi belongs to a short-distance wireless transmission technology. The mobile phone may help, by using the Wi-Fi module 770, the user receive and send an email, browse a web page, access streaming media, and the like. The Wi-Fi module 770 provides wireless broadband internet access for the user. Although FIG. 23 shows the Wi-Fi module 770, it may be understood that the Wi-Fi module 770 is not a mandatory component of the mobile phone, and may be completely omitted based on a requirement without changing the essence of the present disclosure.

The processor 780 is a control center of the mobile phone, and connects all parts of the entire mobile phone by using various interfaces and lines. By running or executing the software program and/or the module stored in the memory 720 and invoking the data stored in the memory 720, the processor 780 performs various functions and/or data processing of the mobile phone, to perform overall monitoring on the mobile phone. In one embodiment, the processor 780 may include one or more processing units. In one embodiment, the processor 780 may integrate an application processor and a modem processor. The application processor mainly processes the operating system, a user interface, the application program, and the like, and the modem processor mainly processes wireless communication. It should be understood that the modem processor may alternatively not be integrated in the processor 780.

The mobile phone further includes the power supply 790 (such as a battery) that supplies power to each component.

In one embodiment, the power supply may be logically connected to the processor 780 by using a power management system, to implement functions such as management of charging, discharging, and power consumption by using the power management system.

Although not shown, the mobile phone may further include a camera, a Bluetooth module, and the like. Details are not described herein.

In this embodiment of the present disclosure, the processor 780 included in the terminal device further has the following functions:

receiving first indication information sent by a network device, where the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;

determining a measurement resource based on the first indication information, where the measurement resource is determined in the measurement period based on the start position of the first time unit and the start position of the second time unit;

performing signal strength measurement on a signal on the measurement resource, to obtain a measurement result; and sending the measurement result to the network device.

In one embodiment, the processor 780 is specifically configured to perform the following operations:

receiving a plurality of pieces of first indication information sent by the network device;

determining a plurality of measurement resources based on the plurality of pieces of first indication information, where each piece of first indication information is in a one-to-one correspondence with each measurement resource;

performing signal strength measurement on the plurality of measurement resources, to obtain a plurality of measurement results, where each measurement result is in a one-to-one correspondence with each measurement resource; and sending the plurality of measurement results to the network device.

In one embodiment, the processor 780 is further configured to perform the following operations:

receiving second indication information sent by the network device, where the second indication information is used to indicate whether to perform measurement and/or reporting on the measurement resource.

Figure 24:
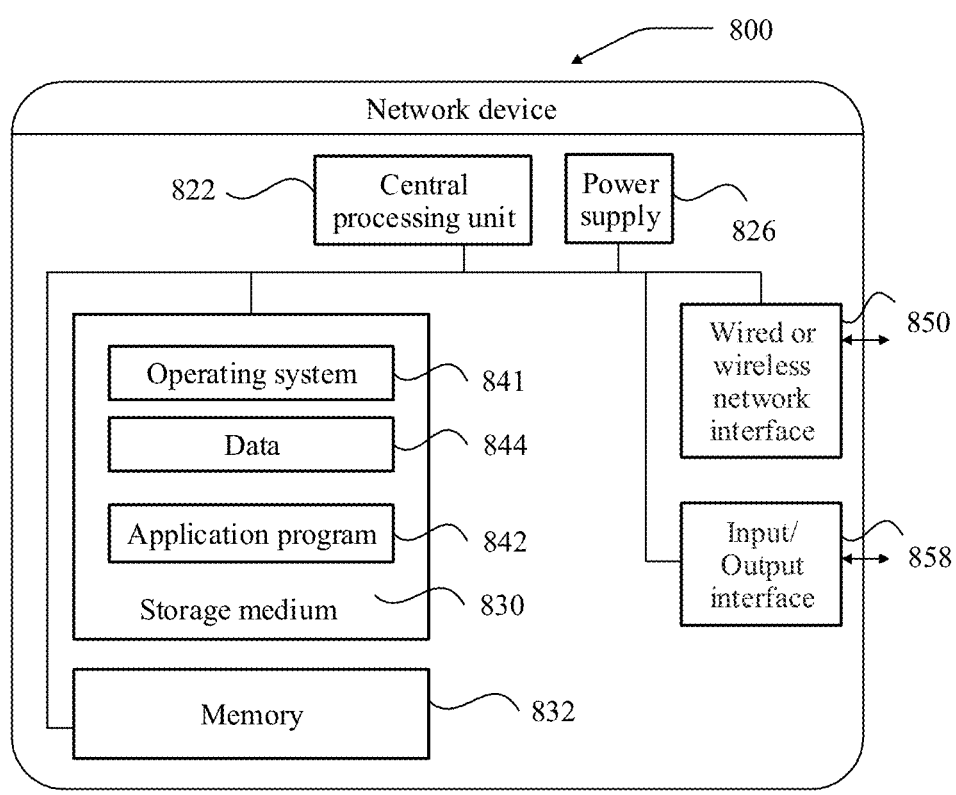
FIG. 24 is a schematic structural diagram of a network device according to an embodiment of the present disclosure.

FIG. 24 is a schematic structural diagram of a network device according to an embodiment of the present disclosure. The network device 800 may vary greatly due to different configurations or performance, and may include one or more central processing units (CPU) 822 (for example, one or more processors), a memory 832, and one or more storage media 830 (for example, one or more mass storage devices) storing application programs 842 or data 844. The memory 832 and the storage media 830 may be used for temporary storage or persistent storage. The program stored in the storage medium 830 may include one or more modules (not shown in the figure). Each module may include a series of instruction operations for the network device. Further, the central processing unit 822 may be set to communicate with the storage medium 830, to perform, on the network device 800, the series of instruction operations in the storage medium 830.

The network device 800 may further include one or more power supplies 826, one or more wired or wireless network interfaces 850, one or more input/output interfaces 858, and/or one or more operating systems 841, such as Windows Server™ Mac OS X™, Unix™, Linux™, or FreeBSD™.

The operations performed by the network device in the foregoing embodiments may be based on the structure of the network device shown in FIG. 24.

In this embodiment of the present disclosure, the CPU 822 included in the network device further has the following functions:

sending first indication information to a terminal device, where the first indication information is used by the terminal device to determine a measurement resource, the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; and receiving a measurement result sent by the terminal device, where the measurement result is obtained by the terminal device by performing signal strength measurement on a signal on the measurement resource.

In one embodiment, the CPU 822 is specifically configured to perform the following operations:

sending a plurality of pieces of first indication information to the terminal device, so that the terminal device determines a plurality of measurement resources based on the plurality of pieces of first indication information, where each piece of first indication information is in a one-to-one correspondence with each measurement resource; and receiving a plurality of measurement results sent by the terminal device, where the plurality of measurement results are obtained by the terminal device by performing signal strength measurement on the plurality of measurement resources, and each measurement result is in a one-to-one correspondence with each measurement resource.

In one embodiment, the CPU 822 is further configured to perform the following operation:

sending second indication information to the terminal device, where the second indication information is used to indicate whether to perform measurement and/or reporting on the measurement resource.

Figure 25:
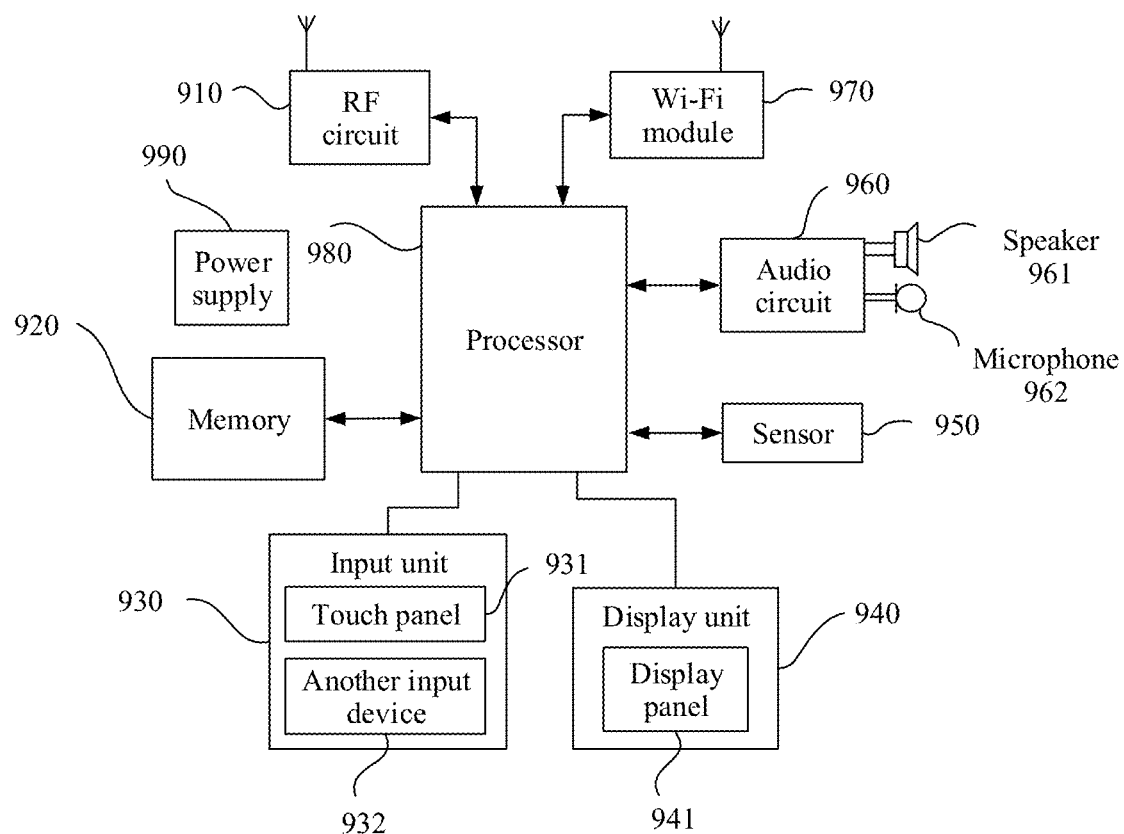
FIG. 25 is a schematic structural diagram of a terminal device according to an embodiment of the present disclosure.

An embodiment of the present disclosure further provides another terminal device, as shown in FIG. 25. For ease of description, only a part related to this embodiment of the present disclosure is shown. For specific technical details that are not disclosed, refer to the method part in the embodiments of the present disclosure. The terminal device may be any terminal device including a mobile phone, a tablet computer, a PDA, a POS, a vehicle-mounted computer, and the like. For example, the terminal device is a mobile phone.

FIG. 25 is a block diagram of a partial structure of a mobile phone related to the terminal device according to this embodiment of the present disclosure. Referring to FIG. 25, the mobile phone includes components such as an RF circuit 910, a memory 920, an input unit 930, a display unit 940, a sensor 950, an audio circuit 960, a Wi-Fi module 970, a processor 980, and a power supply 990. A person skilled in the art may understand that, the structure of the mobile phone shown in FIG. 25 does not constitute a limitation on the mobile phone, and the mobile phone may include more or fewer components than those shown in the figure, or some components may be combined, or a different component deployment may be used.

The following describes each constituent component of the mobile phone in detail with reference to FIG. 25.

The RF circuit 910 may be configured to send and receive a signal in an information sending and receiving process or a call process. Particularly, the RF circuit 910 receives downlink information from a base station, then delivers the downlink information to the processor 980 for processing, and sends related uplink data to the base station. The RF circuit 910 usually includes, but is not limited to an antenna, at least one amplifier, a transceiver, a coupler, an LNA, a duplexer, and the like. In addition, the RF circuit 910 may further communicate with a network and another device through wireless communication. Any communication standard or protocol may be used for the wireless communication, including but not limited to GSM, GPRS, CDMA, WCDMA, LTE, an email, an SMS, and the like.

The memory 920 may be configured to store a software program and a module. The processor 980 runs the software program and the module stored in the memory 920, to perform various function applications and data processing of the mobile phone. The memory 920 may mainly include a program storage area and a data storage area. The program storage area may store an operating system, an application program required by at least one function (for example, a sound play function and an image play function), and the like. The data storage area may store data (for example, audio data and an address book) created based on use of the mobile phone, and the like. In addition, the memory 920 may include a high speed random access memory, and may further include a nonvolatile memory, for example, at least one magnetic disk storage device, a flash memory device, or another volatile solid-state storage device.

The input unit 930 may be configured to: receive entered digital or character information, and generate key signal input related to user setting and function control of the mobile phone. Specifically, the input unit 930 may include a touch panel 931 and another input device 932. The touch panel 931, also referred to as a touchscreen, may collect a touch operation (for example, an operation performed by a user on or near the touch panel 931 by using any proper object or accessory such as a finger or a stylus) performed by the user on or near the touch panel 931, and drive a corresponding connection apparatus based on a preset program. In one embodiment, the touch panel 931 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch coordinates, then sends the touch coordinates to the processor 980, and can receive and perform a command sent by the processor 980. In addition, the touch panel 931 may be implemented in a plurality of types, such as a resistive type, a capacitive type, an infrared type, and a surface acoustic wave type. The input unit 930 may include the another input device 932 in addition to the touch panel 931. Specifically, the another input device 932 may include, but is not limited to, one or more of a physical keyboard, a function key (such as a volume control key or an on/off key), a trackball, a mouse, a joystick, or the like.

The display unit 940 may be configured to display information entered by the user or information provided for the user, and various menus of the mobile phone. The display unit 940 may include a display panel 941. In one embodiment, the display panel 941 may be configured in a form of an LCD, an OLED, or the like. Further, the touch panel 931 may cover the display panel 941. When detecting the touch operation on or near the touch panel 931, the touch panel 931 transmits the touch operation to the processor 980 to determine a type of a touch event, and then the processor 980 provides a corresponding visual output on the display panel 941 based on the type of the touch event. In FIG. 25, the touch panel 931 and the display panel 941 are used as two independent components to implement input and output functions of the mobile phone. However, in some embodiments, the touch panel 931 and the display panel 941 may be integrated to implement the input and output functions of the mobile phone.

The mobile phone may further include at least one sensor 950, for example, a light sensor, a motion sensor, and another sensor. Specifically, the optical sensor may include an ambient light sensor and a proximity sensor. The ambient light sensor may adjust luminance of the display panel 941 based on brightness of ambient light. The proximity sensor may turn off the display panel 941 and/or backlight when the mobile phone approaches an ear. As a type of motion sensor, an accelerometer sensor may detect values of acceleration in all directions (usually, three axes), may detect a value and a direction of gravity when the accelerometer sensor is static, and may be used in an application for identifying a mobile phone posture (such as screen switching between a landscape mode and a portrait mode, a related game, or magnetometer posture calibration), a function related to vibration identification (such as a pedometer or a strike), and the like. For another sensor such as a gyroscope, a barometer, a hygrometer, a thermometer, or an infrared sensor that may be further configured in the mobile phone, details are not described herein.

The audio circuit 960, a speaker 961, and a microphone 962 may provide an audio interface between the user and the mobile phone. The audio circuit 960 may convert received audio data into an electrical signal, and transmit the electrical signal to the speaker 961, and the speaker 961 converts the electrical signal into a sound signal for output. In addition, the microphone 962 converts a collected sound signal into an electrical signal. The audio circuit 960 receives the electrical signal, converts the electrical signal into audio data, and then outputs the audio data to the processor 980 for processing. The processor 980 sends the audio data to, for example, another mobile phone by using the RF circuit 910, or outputs the audio data to the memory 920 for further processing Wi-Fi belongs to a short-distance wireless transmission technology. The mobile phone may help, by using the Wi-Fi module 970, the user receive and send an email, browse a web page, access streaming media, and the like. The Wi-Fi module 970 provides wireless broadband internet access for the user. Although FIG. 25 shows the Wi-Fi module 970, it may be understood that the Wi-Fi module 970 is not a mandatory component of the mobile phone, and may be completely omitted based on a requirement without changing the essence of the present disclosure.

The processor 980 is a control center of the mobile phone, and connects all parts of the entire mobile phone by using various interfaces and lines. By running or executing the software program and/or the module stored in the memory 920 and invoking the data stored in the memory 920, the processor 980 performs various functions and/or data processing of the mobile phone, to perform overall monitoring on the mobile phone. In one embodiment, the processor 980 may include one or more processing units. In one embodiment, the processor 980 may integrate an application processor and a modem processor. The application processor mainly processes the operating system, a user interface, the application program, and the like, and the modem processor mainly processes wireless communication. It should be understood that the modem processor may alternatively not be integrated in the processor 980.

The mobile phone further includes the power supply 990 (such as a battery) that supplies power to each component. In one embodiment, the power supply may be logically connected to the processor 980 by using a power management system, to implement functions such as management of charging, discharging, and power consumption by using the power management system.

Although not shown, the mobile phone may further include a camera, a Bluetooth module, and the like. Details are not described herein.

In this embodiment of the present disclosure, the processor 980 included in the terminal device further has the following functions:

receiving first indication information sent by a network device, where the first indication information includes first sub-information and second sub-information, the first sub-information is used to indicate a measurement period for measurement, the measurement period includes at least one second time unit, the second time unit includes at least two first time units, and the second sub-information is used to indicate a start position, of a time resource corresponding to a measurement resource, in the measurement period;

determining the measurement resource based on the first indication information, where the measurement resource is determined in the measurement period based on a start position of the first time unit;

performing signal strength measurement on a signal on the measurement resource, to obtain a measurement result; and sending the measurement result to the network device.

In one embodiment, the processor 980 is specifically configured to perform the following operations:

receiving a plurality of pieces of first indication information sent by the network device;

determining a plurality of measurement resources based on the plurality of pieces of first indication information, where each piece of first indication information is in a one-to-one correspondence with each measurement resource;

performing signal strength measurement on the plurality of measurement resources, to obtain a plurality of measurement results, where each measurement result is in a one-to-one correspondence with each measurement resource; and sending the plurality of measurement results to the network device.

In one embodiment, the processor 980 is further configured to perform the following operations:

receiving second indication information sent by the network device, where the second indication information is used to indicate whether to perform measurement and/or reporting on the measurement resource.

Figure 26:
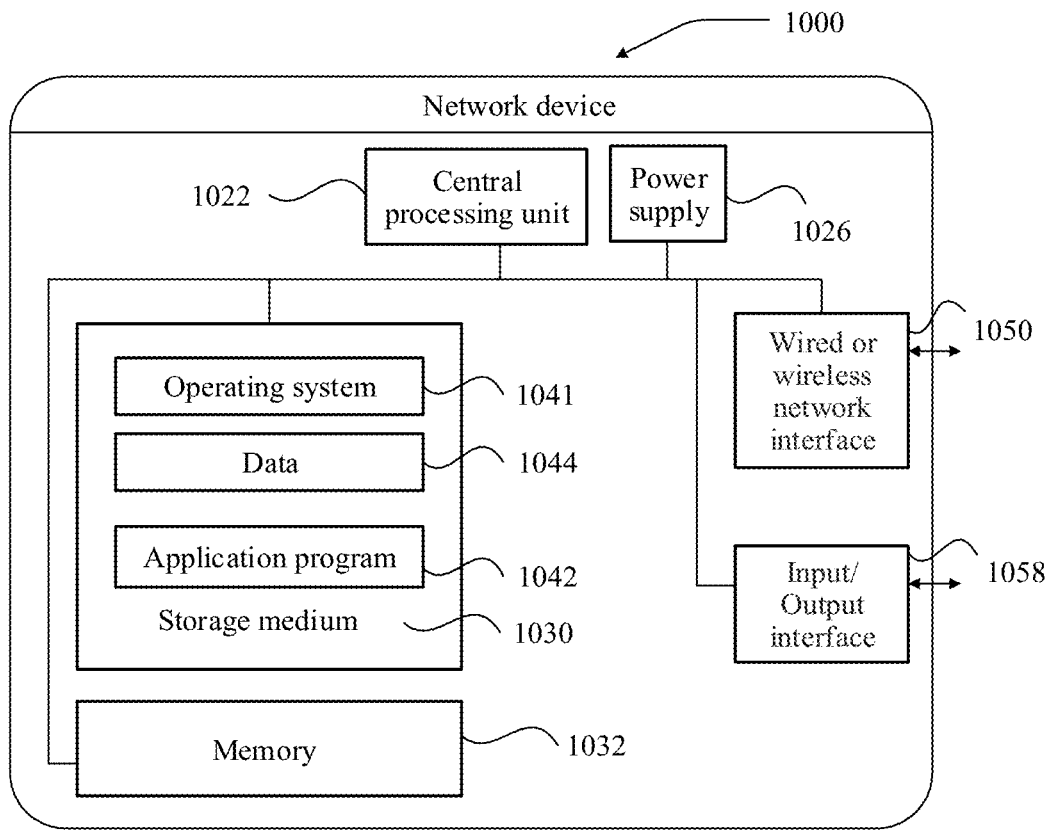
FIG. 26 is a schematic structural diagram of a network device according to an embodiment of the present disclosure.

FIG. 26 is a schematic structural diagram of a network device according to an embodiment of the present disclosure. The network device 1000 may vary greatly due to different configurations or performance, and may include one or more CPUs 1022 (for example, one or more processors), a memory 1032, and one or more storage media 1030 (for example, one or more mass storage devices) storing application programs 1042 or data 1044. The memory 1032 and the storage medium 1030 may be used for temporary storage or persistent storage. The program stored in the storage medium 1030 may include one or more modules (not shown in the figure). Each module may include a series of instruction operations for the network device. Further, the central processing unit 1022 may be set to communicate with the storage medium 1030, to perform, on the network device 1000, the series of instruction operations in the storage medium 1030.

The network device 1000 may further include one or more power supplies 1026, one or more wired or wireless network interfaces 1050, one or more input/output interfaces 1058, and/or one or more operating systems 1041, such as Windows Server™, Mac OS X™, Unix™, Linux™, or Free-BSD™.

The operations performed by the network device in the foregoing embodiments may be based on the structure of the network device shown in FIG. 26.

In this embodiment of the present disclosure, the CPU 1022 included in the network device further has the following functions:

sending first indication information to a terminal device, where the first indication information is used by the terminal device to determine a measurement resource, the first indication information includes first sub-information and second sub-information, the first sub-information is used to indicate a measurement period for measurement, the measurement period includes at least one second time unit, the second time unit includes at least two first time units, the second sub-information is used to indicate a start position, of a time resource corresponding to the measurement resource, in the measurement period, and the measurement resource is determined in the measurement period based on a start position of the first time unit; and receiving a measurement result sent by the terminal device, where the measurement result is obtained by the terminal device by performing signal strength measurement on a signal on the measurement resource.

In one embodiment, the CPU 1022 is specifically configured to perform the following operations:

sending a plurality of pieces of first indication information to the terminal device, so that the terminal device determines a plurality of measurement resources based on the plurality of pieces of first indication information, where each piece of first indication information is in a one-to-one correspondence with each measurement resource; and receiving a plurality of measurement results sent by the terminal device, where the plurality of measurement results are obtained by the terminal device by performing signal strength measurement on the plurality of measurement resources, and each measurement result is in a one-to-one correspondence with each measurement resource.

In one embodiment, the CPU 1022 is further configured to perform the following operation:

sending second indication information to the terminal device, where the second indication information is used to indicate whether to perform measurement and/or reporting on the measurement resource.

Figure 27:
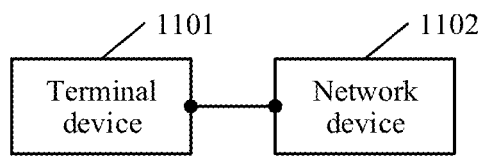
FIG. 27 is a schematic diagram of an embodiment of a signal strength measurement system according to an embodiment of the present disclosure.

FIG. 27 is a schematic diagram of an embodiment of a signal strength measurement system according to an embodiment of the present disclosure. The signal strength measurement system includes a terminal device 1101 and a network device 1102.

In this embodiment, the network device 1102 sends first indication information to the terminal device 1101, where the first indication information includes first sub-information, second sub-information, and third sub-information, the first sub-information is used to indicate a measurement period for measurement, the measurement period includes at least one second time unit, the second time unit includes at least two first time units, the third sub-information is used to indicate an offset of a start position of a second time unit for measurement relative to a start position of the measurement period, and the second sub-information is used to indicate an offset of a start position of the first time unit for measurement in the measurement period relative to the start position of the second time unit for measurement. The terminal device 1101 determines a measurement resource based on the first indication information, where the measurement resource is determined in the measurement period based on the start position of the first time unit and the start position of the second time unit. The terminal device 1101 performs signal strength measurement on a signal on the measurement resource, to obtain a measurement result. The terminal device 1101 sends the measurement result to the network device 1102.

In this embodiment of the present disclosure, the signal strength measurement system is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

Figure 28:
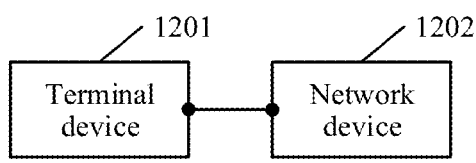
FIG. 28 is a schematic diagram of an embodiment of a signal strength measurement system according to an embodiment of the present disclosure.

FIG. 28 is a schematic diagram of an embodiment of a signal strength measurement system according to an embodiment of the present disclosure. The signal strength measurement system includes a terminal device 1201 and a network device 1202.

In this embodiment, the network device 1202 sends first indication information to the terminal device 1201, where the first indication information includes first sub-information and second sub-information, the first sub-information is used to indicate a measurement period for measurement, the measurement period includes at least one second time unit, the second time unit includes at least two first time units, and the second sub-information is used to indicate a start position, of a time resource corresponding to a measurement resource, in the measurement period. The terminal device 1201 determines the measurement resource based on the first indication information, where the measurement resource is determined based on a start position of the first time unit in the measurement period. The terminal device 1201 performs signal strength measurement on a signal on the measurement resource, to obtain a measurement result. The terminal device 1201 sends the measurement result to the network device 1202.

In this embodiment of the present disclosure, the signal strength measurement system is provided. The network device can more flexibly instruct the terminal device to measure and report a signal strength, so that signal strengths in several symbols in a subframe can be precisely measured. Therefore, more accurate CLI information can be obtained, to improve network transmission quality and a transmission rate during coordinated scheduling.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that the person may still make modifications to the technical solutions described in the foregoing embodiments or make equivalent replacements to some technical features thereof, without departing from the spirit and scope of the technical solutions of the embodiments of the present disclosure.

What is claimed is:

1. A signal strength measurement method, comprising:
receiving first indication information from a network device, wherein the first indication information comprises first sub-information, second sub-information, and third sub-information, the first sub-information is used to indicate a measurement period for measurement, the measurement period comprises at least one second time unit, the second time unit comprises at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;
determining a measurement resource based on the first indication information, wherein the measurement resource is determined in the measurement period based on the start position of the first time unit and the start position of the second time unit;
performing signal strength measurement on a signal on the measurement resource, to obtain a measurement result; and
sending the measurement result to the network device.

2. The method according to claim 1, wherein the first indication information further comprises measurement duration indication information, the measurement duration indication information indicates measurement duration, and a value of the measurement duration comprises one first time unit, two first time units, four first time units, or six first time units; and
the measurement resource is determined in the measurement period based on the start position of the first time unit, the start position of the second time unit, and the measurement duration.

3. The method according to claim 1, further comprising receiving measurement frequency band indication information, wherein the measurement frequency band indication information indicates a measurement frequency band;

the measurement frequency band comprises a bandwidth part for measurement, a measurement bandwidth, and a frequency domain position, the measurement bandwidth is less than or equal to a bandwidth of the bandwidth part, the bandwidth part comprises a plurality of frequency domain units, and the frequency domain position indicates a target frequency domain unit used for measurement in the bandwidth part; or the measurement frequency band comprises the bandwidth part for measurement and the measurement bandwidth; and the measurement resource is determined in the measurement period based on the start position of the first time unit, the start position of the second time unit, and the measurement frequency band.

4. The method according to claim 1, wherein the receiving first indication information from a network device comprises:
receiving a plurality of pieces of first indication information from the network device;
the determining a measurement resource based on the first indication information comprises:
determining a plurality of measurement resources based on the plurality of pieces of first indication information, wherein each piece of first indication information is in a one-to-one correspondence with each measurement resource;
the performing signal strength measurement on a signal on the measurement resource, to obtain a measurement result comprises:
performing signal strength measurement on signals on the plurality of measurement resources, to obtain a plurality of measurement results, wherein each measurement result is in a one-to-one correspondence with each measurement resource; and
the sending the measurement result to the network device comprises:
sending the plurality of measurement results to the network device.

5. The method according to claim 1, wherein the method further comprises:
receiving second indication information from the network device, wherein the second indication information is used to indicate whether to perform measurement and/or reporting on the measurement resource.

6. A signal strength measurement method, comprising:
sending first indication information to a terminal device, wherein the first indication information is used by the terminal device to determine a measurement resource, the first indication information comprises first sub-information, second sub-information, and third sub-information, the first sub-information is used to indicate a measurement period for measurement, the measurement period comprises at least one second time unit, the second time unit comprises at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; and
receiving a measurement result from the terminal device, wherein the measurement result is obtained by the terminal device by performing signal strength measurement on a signal on the measurement resource.

7. The method according to claim 6, wherein the first indication information further comprises measurement duration indication information, the measurement duration indication information indicates measurement duration, and a value of the measurement duration comprises one first time unit, two first time units, four first time units, or six first time units; and
the measurement resource is determined in the measurement period based on the start position of the first time unit, the start position of the second time unit, and the measurement duration.

8. The method according to claim 6, further comprising sending measurement frequency band indication information, wherein the measurement frequency band indication information indicates a measurement frequency band;
the measurement frequency band comprises a bandwidth part for measurement, a measurement bandwidth, and a frequency domain position, the measurement bandwidth is less than or equal to a bandwidth of the bandwidth part, the bandwidth part comprises a plurality of frequency domain units, and the frequency domain position indicates a target frequency domain unit used for measurement in the bandwidth part; or the measurement frequency band comprises the bandwidth part for measurement and the measurement bandwidth; and
the measurement resource is determined in the measurement period based on the start position of the first time unit, the start position of the second time unit, and the measurement frequency band.

9. The method according to claim 6, wherein the sending first indication information to a terminal device comprises:
sending a plurality of pieces of first indication information to the terminal device, so that the terminal device determines a plurality of measurement resources based on the plurality of pieces of first indication information, wherein each piece of first indication information is in a one-to-one correspondence with each measurement resource; and
the receiving a measurement result from the terminal device, wherein the measurement result is obtained by the terminal device by performing signal strength measurement on a signal on the measurement resource comprises:
receiving a plurality of measurement results from the terminal device, wherein the plurality of measurement results are obtained by the terminal device by performing signal strength measurement on signals on the plurality of measurement resources, and each measurement result is in a one-to-one correspondence with each measurement resource.

10. The method according to claim 6, wherein the method further comprises:
sending second indication information to the terminal device, wherein the second indication information is used to indicate whether to perform measurement and/or reporting on the measurement resource.

11. A terminal device, comprising:
a receiver, configured to receive first indication information from a network device, wherein the first indication information comprises first sub-information, second sub-information, and third sub-information, the first sub-information is used to indicate a measurement period for measurement, the measurement period comprises at least one second time unit, the second time unit comprises at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;

a processor, configured to determine a measurement resource based on the first indication information received by the receiver, wherein the measurement resource is determined in the measurement period based on the start position of the first time unit and the start position of the second time unit; perform signal strength measurement on a signal on the measurement resource determined by the processor, to obtain a measurement result; and a transmitter, configured to send the measurement result obtained by the processor to the network device.

12. The terminal device according to claim 11, wherein the receiver is configured to receive a plurality of pieces of first indication information from the network device;

the processor is configured to determine a plurality of measurement resources based on the plurality of pieces of first indication information received by the receiver, wherein each piece of first indication information is in a one-to-one correspondence with each measurement resource; perform signal strength measurement on signals on the plurality of measurement resources determined by the processor, to obtain a plurality of measurement results, wherein each measurement result is in a one-to-one correspondence with each measurement resource; and the transmitter is configured to send the plurality of measurement results obtained by the processor to the network device.

13. The terminal device according to claim 11, wherein the receiver is further configured to receive second indication information from the network device, wherein the second indication information is used to indicate whether to perform measurement and/or reporting on the measurement resource.

14. A network device, comprising:

a transmitter, configured to send first indication information to a terminal device, wherein the first indication information is used by the terminal device to determine a measurement resource, the first indication information comprises first sub-information, second sub-information, and third sub-information, the first sub-information is used to indicate a measurement period for measurement, the measurement period comprises at least one second time unit, the second time unit comprises at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement; and a receiver, configured to receive a measurement result from the terminal device.

15. The network device according to claim 14, wherein the transmitter is configured to send a plurality of pieces of first indication information to the terminal device, wherein each piece of first indication information is in a one-to-one correspondence with each measurement resource; and the receiver is configured to receive a plurality of measurement results from the terminal device, wherein each measurement result is in a one-to-one correspondence with each measurement resource.

16. The network device according to claim 14, wherein the transmitter is further configured to send second indication information to the terminal device, wherein the second indication information is used to indicate whether to perform measurement and/or reporting on the measurement resource.

17. An information transmission device, comprising:

a computer-readable storage medium storing program code; and computer hardware coupled to the computer-readable storage medium and configured to execute the program code to cause the information transmission device to:

receiving first indication information from a network device, wherein the first indication information comprises first sub-information, second sub-information, and third sub-information, the first sub-information is used to indicate a measurement period for measurement, the measurement period comprises at least one second time unit, the second time unit comprises at least two first time units, the third sub-information is used to indicate an offset of a start position of a second time unit for measurement relative to a start position of the measurement period, and the second sub-information is used to indicate an offset of a start position of a first time unit for measurement in the measurement period relative to the start position of the second time unit for measurement;

determining a measurement resource based on the first indication information, wherein the measurement resource is determined in the measurement period based on the start position of the first time unit and the start position of the second time unit;

performing signal strength measurement on a signal on the measurement resource, to obtain a measurement result; and sending the measurement result to the network device.

* * * * *